United States Patent
Kishida et al.

(10) Patent No.: US 8,223,517 B2
(45) Date of Patent: Jul. 17, 2012

(54) POWER CONVERTING APPARATUS WITH MAIN CONVERTER AND SUB-CONVERTER

(75) Inventors: Yukimori Kishida, Tokyo (JP); Akihiko Iwata, Tokyo (JP); Shinichi Ogusa, Tokyo (JP); Akira Imanaka, Tokyo (JP); Tetsuaki Nagano, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 656 days.

(21) Appl. No.: 12/296,286

(22) PCT Filed: Apr. 23, 2007

(86) PCT No.: PCT/JP2007/000437
§ 371 (c)(1),
(2), (4) Date: Oct. 7, 2008

(87) PCT Pub. No.: WO2007/129456
PCT Pub. Date: Nov. 15, 2007

(65) Prior Publication Data
US 2009/0116268 A1    May 7, 2009

(30) Foreign Application Priority Data

Apr. 25, 2006  (JP) .................................. 2006-119959
May 12, 2006  (JP) .................................. 2006-133433

(51) Int. Cl.
*H02M 7/08* (2006.01)
(52) U.S. Cl. ......................................... 363/67; 363/125
(58) Field of Classification Search .................... 363/44, 363/65, 67, 68, 89, 90, 125, 127; 323/266
See application file for complete search history.

(56) References Cited

U.S. PATENT DOCUMENTS

| | | | |
|---|---|---|---|
| 6,956,305 B2 | 10/2005 | Iwata et al. | |
| 7,433,212 B2 * | 10/2008 | Igarashi et al. | 363/37 |

(Continued)

FOREIGN PATENT DOCUMENTS

CN    ZL 02107690.1    8/2005
(Continued)

OTHER PUBLICATIONS

Japanese Office Action issued May 10, 2011, in Patent Application No. 2008-514380.

(Continued)

*Primary Examiner* — Harry Behm
*Assistant Examiner* — Matthew Grubb
(74) *Attorney, Agent, or Firm* — Oblon, Spivak, McClelland, Maier & Neustadt, L.L.P.

(57) ABSTRACT

A converter controllable in regenerative running mode, which is a power converting apparatus capable of suppressing harmonics without increasing the size of a reactor, and reducing power loss and electromagnetic noise. A power converter is configured by directly connecting AC sides of single-phase sub-converters having a DC voltage lower than a DC voltage of a 3-phase main converter to AC input lines of individual phases thereof in series. The main converter is driven by one gate pulse per half recurring cycle and a voltage produced by each sub-converter at AC terminals thereof is controlled to match a difference between an AC power supply voltage and a voltage produced by the main converter at AC terminals thereof, whereby phase voltages of the power converter are generated as the sums of phase voltages of the individual converters.

6 Claims, 33 Drawing Sheets

U.S. PATENT DOCUMENTS

2007/0030716 A1 * 2/2007 Manolescu ............... 363/84

FOREIGN PATENT DOCUMENTS

| | | |
|---|---|---|
| JP | 7 123722 | 5/1995 |
| JP | 10 14108 | 1/1998 |
| JP | 10 210659 | 8/1998 |
| JP | 2000 92862 | 3/2000 |
| JP | 2000 354361 | 12/2000 |
| JP | 2004-7941 | 1/2004 |
| JP | 2004-180393 | 6/2004 |
| JP | 2005-318663 | 11/2005 |

OTHER PUBLICATIONS

"State-of-the-art Electric Railway Engineering" (Investigation Committee on Electric Railway of the Institute of Electrical Engineers of Japan, pp. 60-67, (2000).

European Search Report issued Feb. 17, 2012 in Application No. 07737094.8.

* cited by examiner

FIG. 2
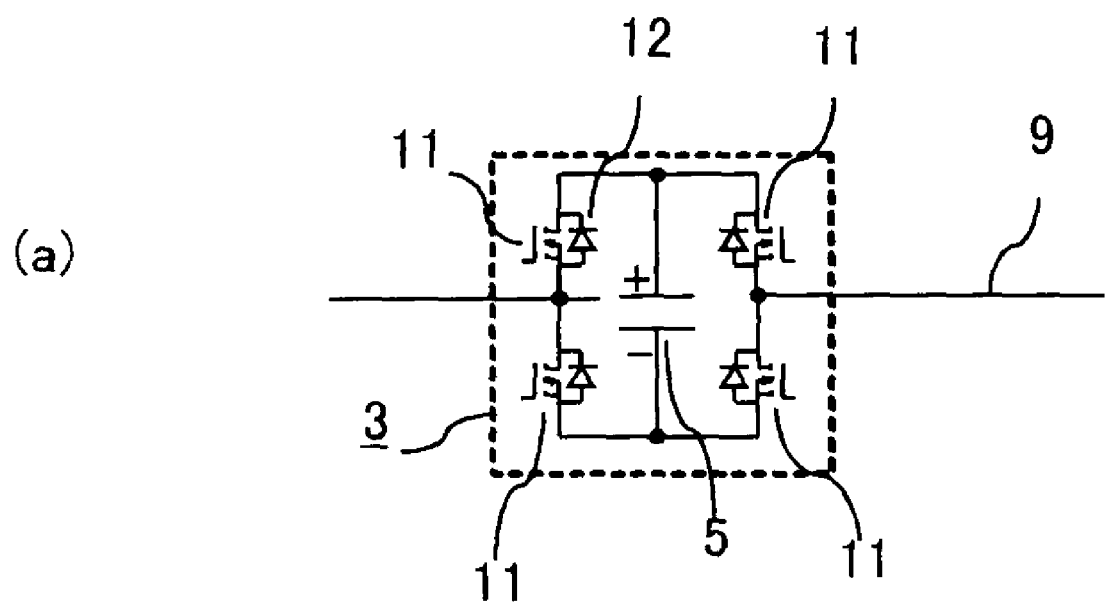
(a)
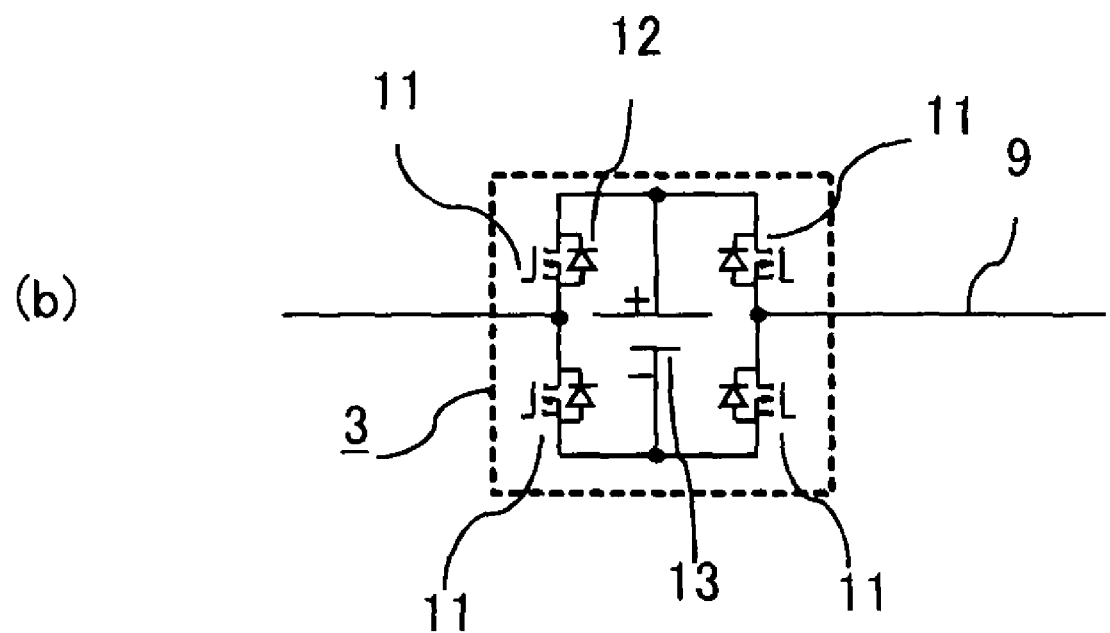
(b)

FLOWCHART FOR SUB-CONVERTER DC VOLTAGE AND CURRENT CONTROL

FIG. 32

TABLE A

| 1 | 2 | 4 | |
|---|---|---|---|
| Vb2 | Vb1 | Vc | GRADATION LEVEL |
| 0 | 0 | 0 | 0 |
| 1 | 0 | 0 | 1 |
| 0 | 1 | 0 | 2 |
| 1 | 1 | 0 | 3 |
| 0 | 0 | 1 | 4 |
| 1 | 0 | 1 | 5 |
| 0 | 1 | 1 | 6 |
| 1 | 1 | 1 | 7 |

TABLE B

| 1 | 3 | 5 | |
|---|---|---|---|
| Vb2 | Vb1 | Vc | GRADATION LEVEL |
| 0 | 0 | 0 | 0 |
| 1 | 0 | 0 | 1 |
| -1 | 1 | 0 | 2 |
| 1 | 1 | 0 | 4 |
| 0 | 0 | 1 | 5 |
| 1 | 0 | 1 | 6 |
| -1 | 1 | 1 | 7 |
| 0 | 1 | 1 | 8 |
| 1 | 1 | 1 | 9 |

TABLE C

| 1 | 3 | 4 | |
|---|---|---|---|
| Vb2 | Vb1 | Vc | GRADATION LEVEL |
| 0 | 0 | 0 | 0 |
| 1 | 0 | 0 | 1 |
| -1 | 1 | 0 | 2 |
| 0 | 1 | 0 | 3 |
| 1 | 1 | 0 | 4 |
| 1 | 0 | 1 | 5 |
| -1 | 1 | 1 | 6 |
| 0 | 1 | 1 | 7 |
| 1 | 1 | 1 | 8 |

TABLE D

| 1 | 3 | 6 | |
|---|---|---|---|
| Vb2 | Vb1 | Vc | GRADATION LEVEL |
| 0 | 0 | 0 | 0 |
| 1 | 0 | 0 | 1 |
| -1 | 1 | 0 | 2 |
| 0 | 1 | 0 | 3 |
| 1 | 1 | 0 | 4 |
| -1 | 0 | 1 | 5 |
| 0 | 0 | 1 | 6 |
| 1 | 0 | 1 | 7 |
| -1 | 1 | 1 | 8 |
| 0 | 1 | 1 | 9 |
| 1 | 1 | 1 | 10 |

TABLE E

| 1 | 3 | 7 | |
|---|---|---|---|
| Vb2 | Vb1 | Vc | GRADATION LEVEL |
| 0 | 0 | 0 | 0 |
| 1 | 0 | 0 | 1 |
| -1 | 1 | 0 | 2 |
| 0 | 1 | 0 | 3 |
| 1 | 1 | 0 | 4 |
| 1 | -1 | 1 | 5 |
| -1 | 0 | 1 | 6 |
| 0 | 0 | 1 | 7 |
| 1 | 0 | 1 | 8 |
| -1 | 1 | 1 | 9 |
| 0 | 1 | 1 | 10 |
| 1 | 1 | 1 | 11 |

POWER CONVERTING APPARATUS WITH MAIN CONVERTER AND SUB-CONVERTER

TECHNICAL FIELD

The present invention relates to a power converting apparatus, and in particular to a converter for converting AC power into DC power.

BACKGROUND ART

A pulse-width modulation (PWM) converter which is an example of a conventional power converting apparatus configured with semiconductor devices having self-extinguishing (or self-turn-off) capability like gate turn-off thyristors (GTOs) can perform switching operation regardless of the polarity of a source voltage and the polarity and magnitude of electric current, so that the PWM converter can be controlled to operate at a power factor of 1 in power running mode and at a power factor of −1 in regenerative running mode (refer to Non-patent Document 1, for example).

Non-patent Document 1: "State-of-the-art Electric Railway Engineering" (Investigation Committee on Electric Railway of the Institute of Electrical Engineers of Japan, published Sep. 11, 2000 by Corona Publishing Co., Ltd.) pp 60-67.

DISCLOSURE OF THE INVENTION

Problems to be Solved by the Invention

The conventional PWM converter however generates a voltage across AC input terminals by PWM control operation using high-voltage pulses. An attempt to eliminate waveform distortion due to waveform shaping and suppress harmonics makes it necessary to increase the size of a reactor in a power system or increase the number of switching cycles. However, an increase in the reactor size results in an increase in equipment size and an increase in the number of switching cycles results in an increase in power loss and electromagnetic noise. Another problem is that a decrease in the number of switching cycles causes an increase in electric current distortion and harmonic currents generated in the power system.

The present invention has been made to overcome the aforementioned problems. Accordingly, it is an object of the invention to provide a power converting apparatus which is a converter for converting AC power into DC power with a capability to control power even in regenerative running mode, the apparatus being configured to suppress harmonics, reduce power loss and electromagnetic noise and offer high power conversion efficiency in a highly compact design.

Means for Solving the Problems

A power converting apparatus according to the present invention is configured with a main converter and sub-converters connected in series which individually convert electric power from AC into DC. A DC voltage of the main converter is made higher than a DC voltage of the sub-converters and the sub-converters are disposed between the main converter and an AC power supply.

ADVANTAGEOUS EFFECTS OF THE INVENTION

In the power converting apparatus thus configured, voltages are generated on an AC input side of a power converter as the sums of voltages generated at individual AC input terminals of the main converter and the sub-converters. As the voltages can be distributedly born by the main converter and the sub-converters in this fashion, it is not necessary to generate high-voltage pulses by switching operation performed at a high frequency, and it is possible to suppress harmonics without increasing the size of a reactor and reduce power loss and electromagnetic noise.

BRIEF DESCRIPTION OF THE DRAWINGS

FIG. 2 is a representation of circuit diagrams of a sub-converter according to the first embodiment of the present invention;

FIG. 32 is a representation of charts showing output logic values and output gradations (voltage levels) of individual converters of the power converting apparatus according to the fourth embodiment of the present invention.

BEST MODES FOR CARRYING OUT THE INVENTION

First Embodiment

A power converting apparatus according to a first embodiment of the present invention is described hereinbelow with reference to the drawings.

Figure 1:
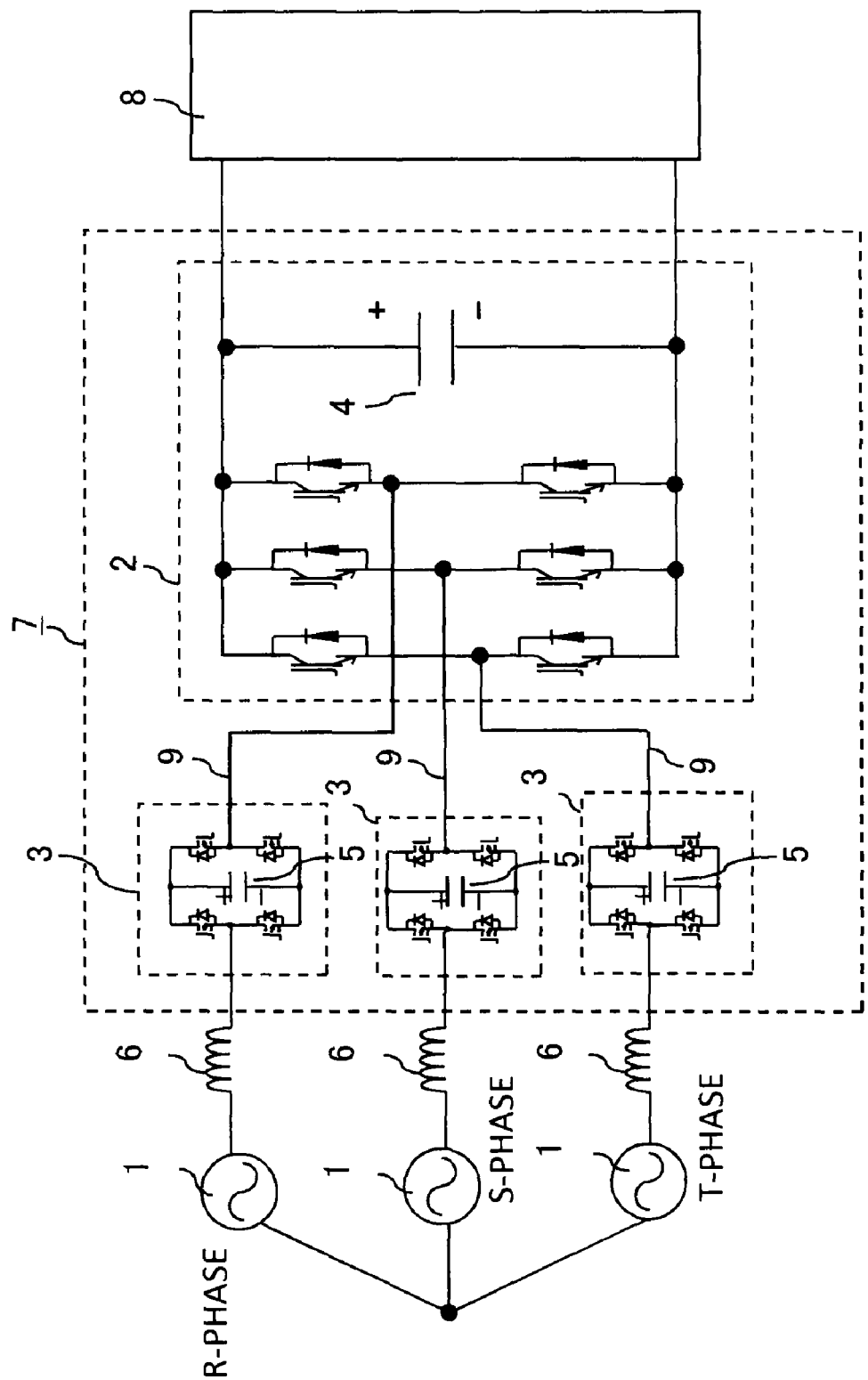
FIG. 1 is a configuration diagram of a power converting apparatus according to a first embodiment of the present invention.

FIG. 1 is a diagram showing the configuration of the power converting apparatus according to the first embodiment of the present invention.

As shown in FIG. 1, the power converting apparatus is configured as a power converter 7 in which AC sides of single-phase sub-converters 3 are series-connected to individual AC input lines 9 of a main converter 2 which is made up of a 3-phase, 2-level converter. The main converter 2 and the individual sub-converters 3 are provided with filter capacitors 4, 5 on respective output sides, the filter capacitor 4 of the main converter 2 and the filter capacitor 5 of each sub-converter 3 holding different DC voltages. The power converter 7 converts AC power fed from a 3-phase AC power system 1 serving as an AC power supply through reactors 6 of the system into DC power and supplies this DC power to the filter capacitor 4. Designated by the numeral 8 is a combination of a motor load and an inverter for driving the motor load or a DC load, for example.

The main converter 2 is a 3-phase, 2-level converter configured with a plurality of self-turn-off switching devices like insulated-gate bipolar transistors (IGBTs), to which diodes are connected in reverse parallel, and the filter capacitor 4. Also, as shown in FIG. 2(a), each sub-converter 3 is configured with a full bridge circuit made up of a plurality of self-turn-off semiconductor switching devices 11 like IGBTs, to which diodes 12 are connected in reverse parallel, and the filter capacitor 5. The self-turn-off switching devices are not limited to IGBTs but may be gate commutated turn-off thyristors (GCTs), GTOs, transistors, metal-oxide-semiconductor field-effect transistors (MOSFETs) or thyristors with no self-turn-off capability, for example, as long as the devices have a capability of performing forced commutating operation.

Here, the voltage held by the filter capacitor 4 of the main converter 2 is made higher than that held by the filter capacitors 5 of the sub-converters 3 and the ratio of the voltage of the filter capacitor 4 to that of the filter capacitors 5 is 2:1, 3:1, 4:1, 5:1 or 6:1, for example, which is selected according to product specifications.

While a DC power supply having a regenerating function to permit exchange of electricity may be connected to the filter capacitors 5 of the sub-converters 3, described here is a case in which the DC power supply is omitted. It is also possible to use a DC power supply 13 like a battery for storing electric charge instead of the filter capacitor 5 of each sub-converter 3 as shown in FIG. 2(b).

The power converting apparatus thus configured is adapted to loads, such a DC load, a motor and an electric light, as well as to formation of an intermediate DC voltage in a power converting apparatus provided with an inverter in a succeeding stage for supplying AC power to an AC power system, for instance. A basic principle of control operation is to perform power conversion between AC and DC so that the DC voltage of the filter capacitor 4 of the main converter 2, that is a DC output voltage, is maintained at a specific value and, for this purpose, control the apparatus in such a way as to generate the same voltage as a power system voltage on the AC side.

Figure 3:
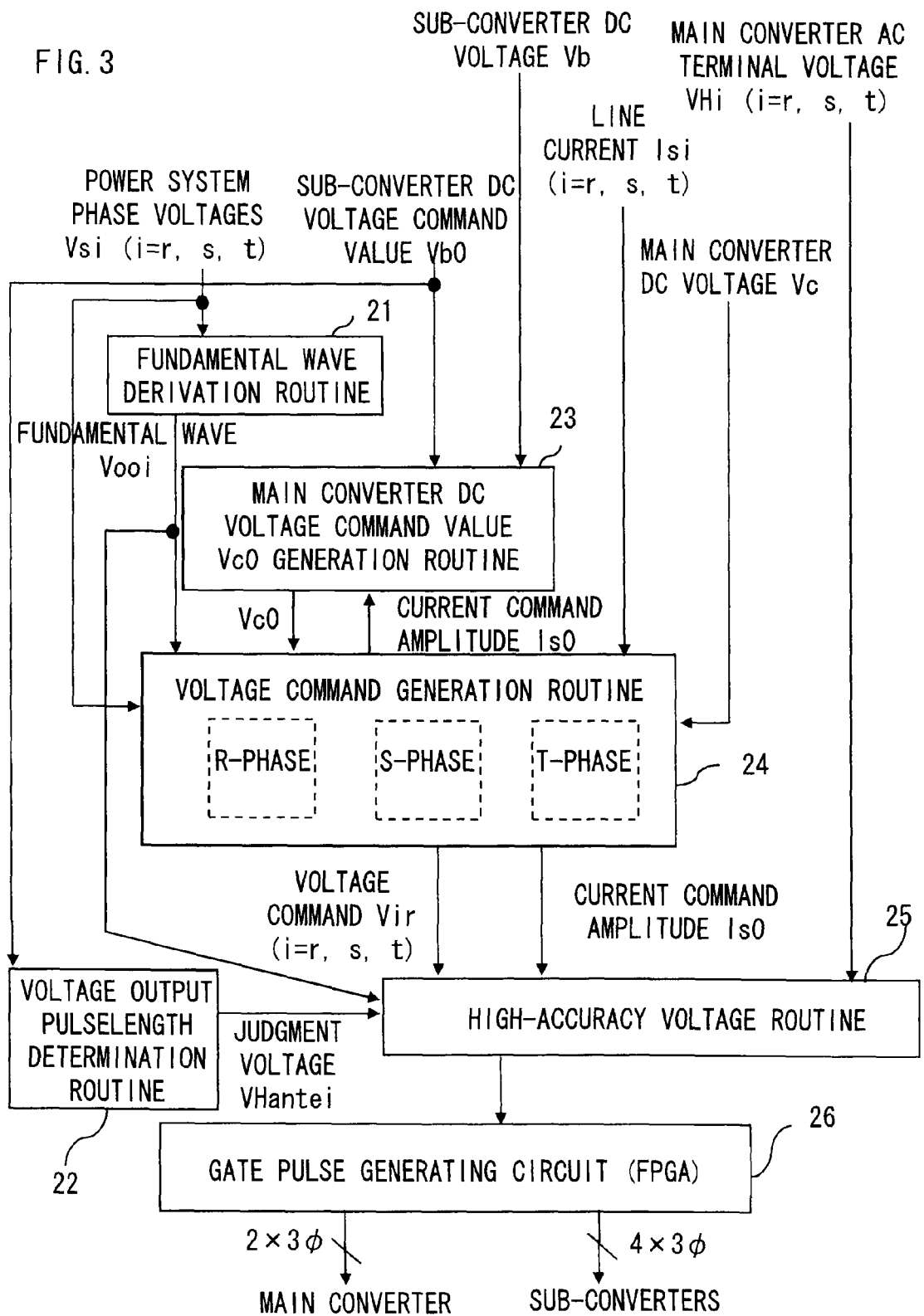
FIG. 3 is a diagram showing an overall flow of control operation of the power converting apparatus according to the first embodiment.

Next, the control operation of the power converting apparatus is described. FIG. 3 is a diagram showing an overall flow of the control operation of the power converting apparatus according to the first embodiment.

As shown in FIG. 3, a fundamental wave derivation routine 21 derives a fundamental wave Vooi of the power system voltage by measuring phase voltages Vsi (i=r, s, t) of the power system 1. A voltage output pulselength determination routine 22 determines the pulselength of a gate signal for driving each switching device in the main converter 2 from a command value (DC voltage command value) Vb0 for the filter capacitor voltage (DC voltage) Vb of each sub-converter 3 and outputs a judgment voltage VHantei which is the value of a fundamental wave of voltage corresponding to this pulselength of gate pulses. A DC voltage command value Vc0 generation routine 23 performed by the main converter 2 determines a command value (DC voltage command value) Vc0 for a filter capacitor voltage (DC voltage) Vc of the main converter 2 so that the DC voltage Vb of each sub-converter 3 follows the set DC voltage command value Vb0.

Also, a voltage command generation routine 24 generates a voltage command (input voltage command) Vir (i=r, s, t) for voltages produced on the AC side of the power converter 7 to control line currents so that the DC voltage Vc of the main converter 2 matches the DC voltage command value Vc0. A high-accuracy voltage routine 25 generates control signals corresponding to the voltage commands for the individual converters 2, 3 based on the voltage command Vir (i=r, s, t) given to the power converter 7. At this time, the main converter 2 generates a one pulse line-to-line voltage per half wave of the power system's line-to-line voltage, and the high-accuracy voltage routine 25 generates the control signals for the main converter 2 and the sub-converters 3 so that the voltage produced on the AC side of the power converter 7 equals the power system voltage. A gate pulse generating circuit (logic circuit) 26 receives the control signals corresponding to the voltage commands for the individual converters 2, 3 from the high-accuracy voltage routine 25 and generates gate pulses for driving the switching devices in the individual converters 2, 3.

Control operations performed by the individual elements 21-26 shown in FIG. 3 are described in detail below.

Figure 4:
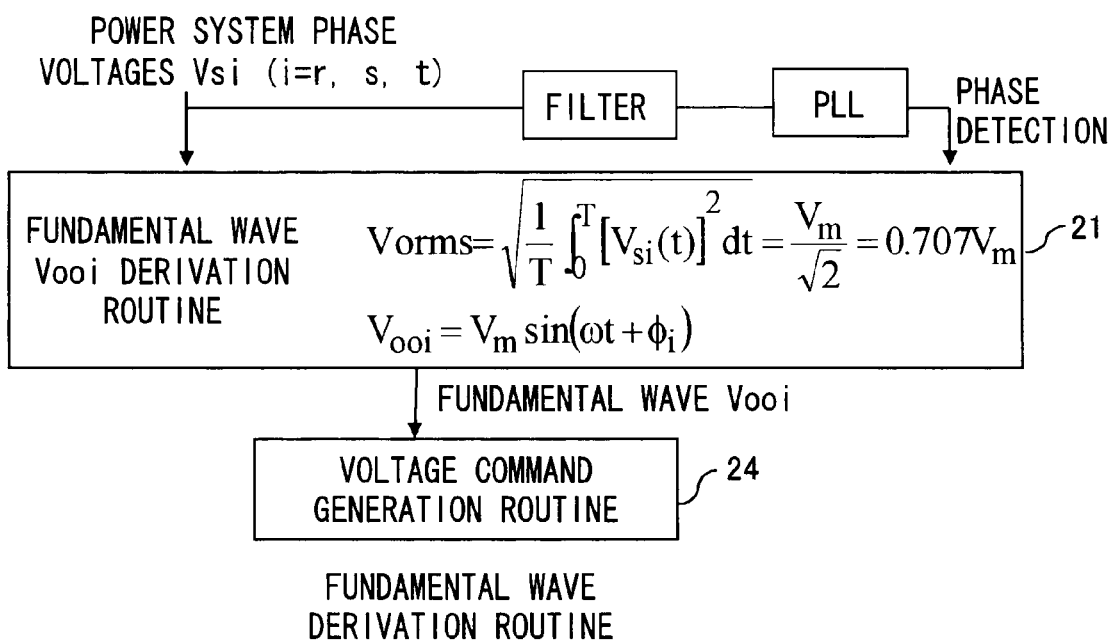
FIG. 4 is a flowchart showing part of the control operation performed by the power converting apparatus according to the first embodiment of the present invention.

FIG. 4 is a flowchart showing processing steps performed in the fundamental wave derivation routine 21. The fundamental wave derivation routine 21 detects phases from the measured phase voltages Vsi (i=r, s, t) of the power system 1, calculates a root-mean-square (rms) voltage value by time-domain integration of the phase voltages Vsi and derives the fundamental wave of voltage Vooi which peaks at $\sqrt{2}$ times the rms voltage value. This fundamental wave Vooi is input into the voltage command generation routine 24.

Figure 5:
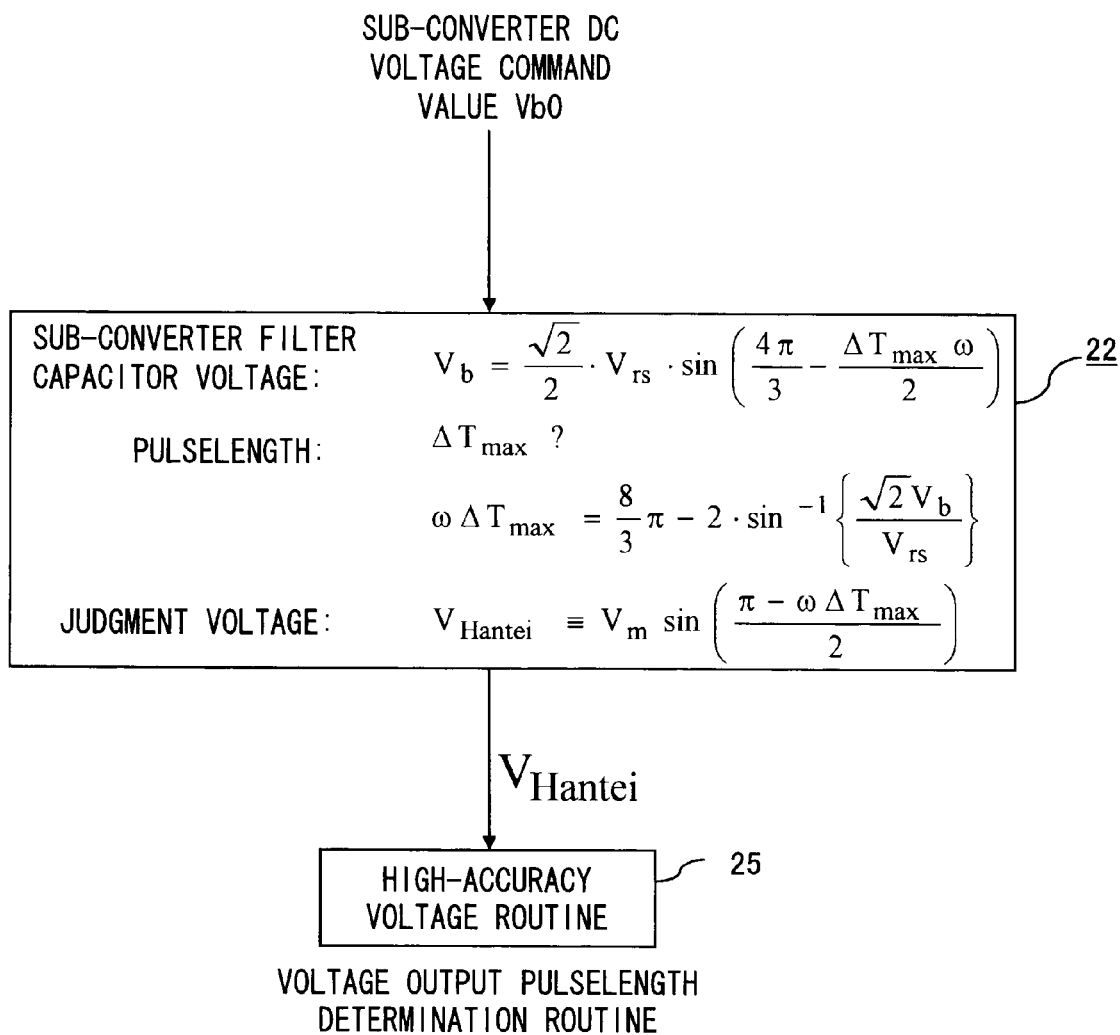
FIG. 5 is a flowchart showing part of the control operation performed by the power converting apparatus according to the first embodiment of the present invention.

FIG. 5 is a flowchart showing processing steps performed in the voltage output pulselength determination routine 22. Using the DC voltage command value Vb0 for each sub-converter 3 as an input, the voltage output pulselength determination routine 22 determines the pulselength of the gate signal for driving the switching devices in the main converter 2 in a manner that permits execution of a current control operation when the voltage of the filter capacitor 5 of each sub-converter 3 is a voltage corresponding to the command value Vb0.

Figure 6:
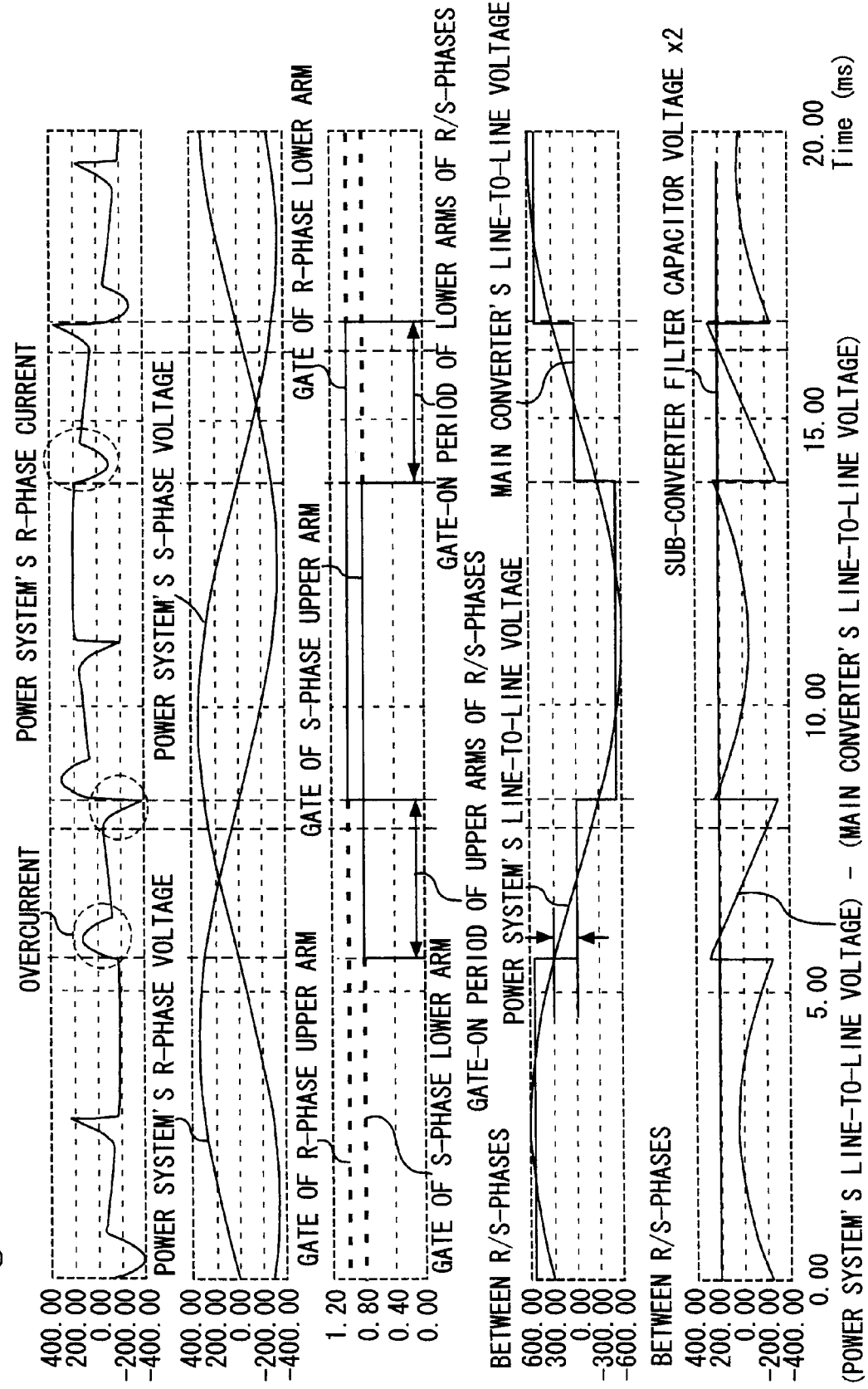
FIG. 6 is a representation of waveform charts for explaining the control operation of FIG. 5.
Figure 7:
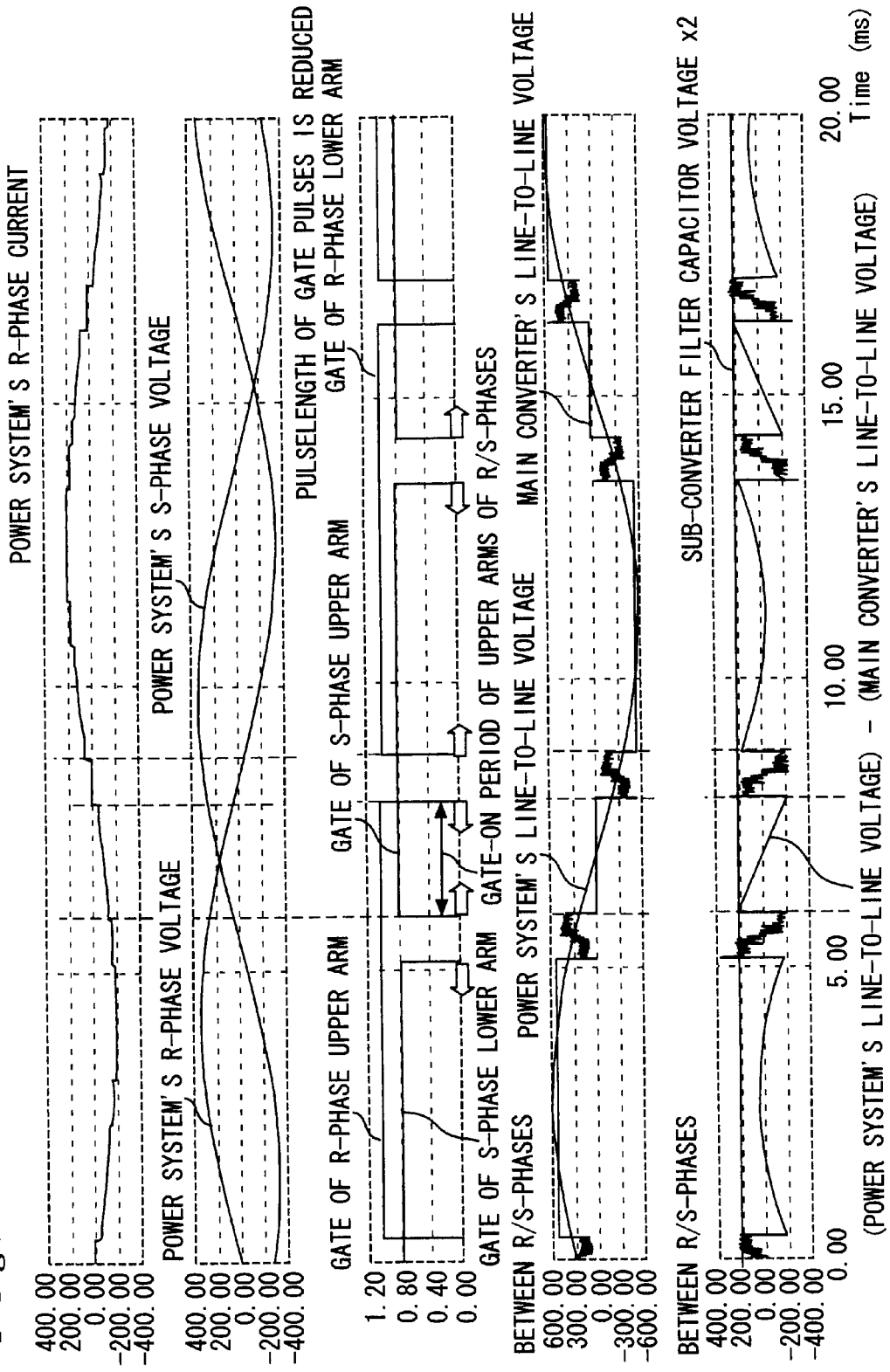
FIG. 7 is a representation of waveform charts for explaining the control operation of FIG. 5.

FIGS. 6 and 7 are waveform charts for explaining an effect of enabling the current control current control operation even at a low filter capacitor voltage by adjusting the pulselength of gate pulses for driving the switching devices in the main converter 2. In particular, FIG. 6 shows a situation before pulselength adjustment and FIG. 7 shows a situation after pulselength adjustment. Here, a pair of R- and S-phases is considered for ease of understanding.

As shown in the Figures, the main converter 2 generates a one pulse line-to-line voltage per half wave of the line-to-line voltage of the power system 1. Also, the sub-converters 3 of the R- and S-phases are so controlled by PWM as to cancel out a difference between the power system's line-to-line voltage and the line-to-line voltage of the main converter 2.

If ON times of the switching devices of the same side, that is, a positive side (upper side) or a negative side (lower side), of R- and S-phase arms of the main converter 2 overlap during the control operation in regenerative running mode, there is formed a short circuit passing through the elements (switching devices and diodes) of the same side with the power system's line-to-line voltage, which is the line-to-line voltage between the power system's R-phase voltage and the power system's S-phase voltage, inserted between the two phases. This overlapping period is a gate ON period of the upper (or lower) arms of the R- and S-phases shown in third rows of FIGS. 6 and 7 and, as shown in fourth rows thereof, the voltage between the R- and S-phases of the main converter 2 becomes zero during this period. This means that it is necessary to generate the power system's line-to-line voltage between the R- and S-phases by a pair of sub-converters 3 of the R- and S-phases existing in the two lines.

Fifth rows of FIGS. 6 and 7 show ((power system's line-to-line voltage)−(main converter's line-to-line voltage)) and the filter capacitor voltage of the pair of sub-converters 3 of the R- and S-phases. If ((power system's line-to-line voltage)−(main converter's line-to-line voltage)) is equal to or lower than the filter capacitor voltage of the pair of sub-converters 3 of the R- and S-phases, it is possible to control currents flowing through the power converter 7, that is the line currents. FIG. 6 shows situations where ((power system's line-to-line voltage)−(main converter's line-to-line voltage)) exceeds the filter capacitor voltage of the pair of sub-converters 3 of the R- and S-phases during periods in which the main converter's line-to-line voltage becomes 0. In these situations, the current control operation becomes impossible and overcurrent events occur in a line current as shown in a first row of FIG. 6. In the case of FIG. 7, on the other hand, the pulselength of gate pulses for driving the switching devices in the main converter 2 is reduced to shorten the gate ON period of the upper (or lower) arms of the R- and S-phases as shown in the third row, thereby making an adjustment for shortening the periods in which the main converter's line-to-line voltage becomes 0. As a consequence, in the case of FIG. 7, ((power system's line-to-line voltage)−(main converter's line-to-line voltage)) becomes equal to or lower than the filter capacitor voltage of the pair of sub-converters 3 of the R- and S-phases at all times and, thus, it is possible to control the line current to assume generally a sine wave pattern containing no overcurrent as shown in a first row of FIG. 7 even when the capacitor voltage of the sub-converters 3 is low.

The voltage output pulselength determination routine 22 determines the pulselength ΔTmax of gate pulses for driving the switching devices in the main converter 2 in the regenerative running mode so that ((power system's line-to-line voltage)−(main converter's line-to-line voltage)) becomes equal to or lower than the filter capacitor voltage of the sub-converters 3 for the two phases, and thereby adjusts the periods in which the line-to-line voltage of the main converter 2 becomes 0 as shown in FIG. 7. Consequently, it becomes possible to control the line-to-line voltage produced on the AC side of the power converter 1 to the same level as the power system's line-to-line voltage and to control the line current. When the main converter 2 generates voltage pulses on the AC side, a voltage twice as high as the filter capacitor voltage Vb of each sub-converter 3 must be larger than the sum of R/S phase-to-phase voltage Vrs excluding harmonics and a maximum value Vnpmax of harmonic peak values, from which the pulselength ΔTmax of gate pulses for driving the switching devices in the main converter 2 can be determined. Then, the voltage output pulselength determination routine 22 outputs the value of the fundamental wave of voltage corresponding to the pulselength ΔTmax of gate pulses as the judgment voltage VHantei. This judgment voltage VHantei is input into the high-accuracy voltage routine 25.

Figure 8:
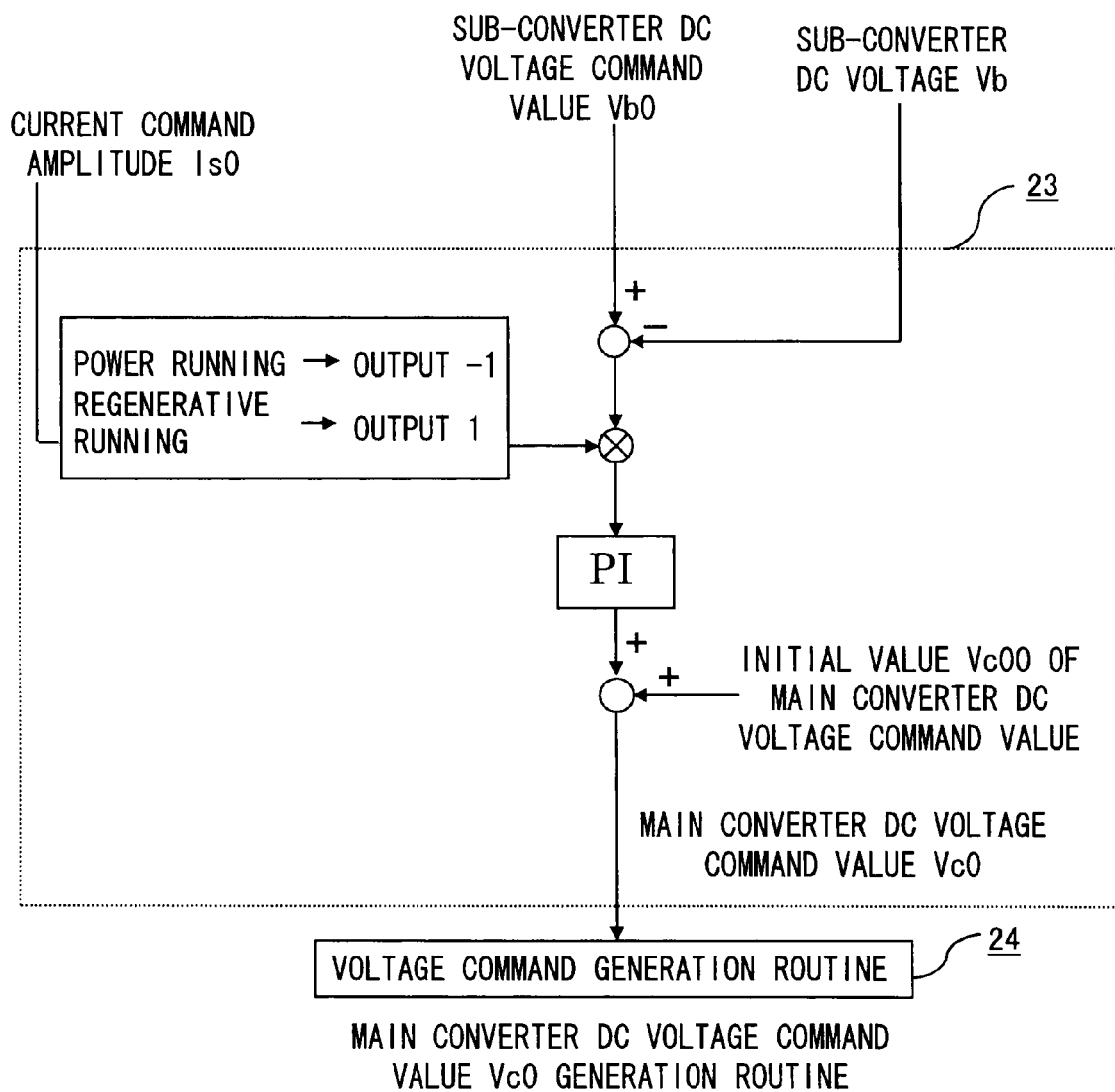
FIG. 8 is a flowchart showing part of the control operation performed by the power converting apparatus according to the first embodiment of the present invention.

FIG. 8 is a flowchart showing processing steps performed in the DC voltage command value Vc0 generation routine 23 by the main converter 2 (hereinafter referred to simply as the DC voltage command value Vc0 generation routine 23). This DC voltage command value Vc0 generation routine 23 determines the DC voltage command value Vc0 for the main converter 2 by proportional-plus-integral (PI) control of a deviation of the DC voltage Vb from the DC voltage command value Vb0 so that the DC voltage Vb of each sub-converter 3 follows the set DC voltage command value Vb0.

Figure 9:
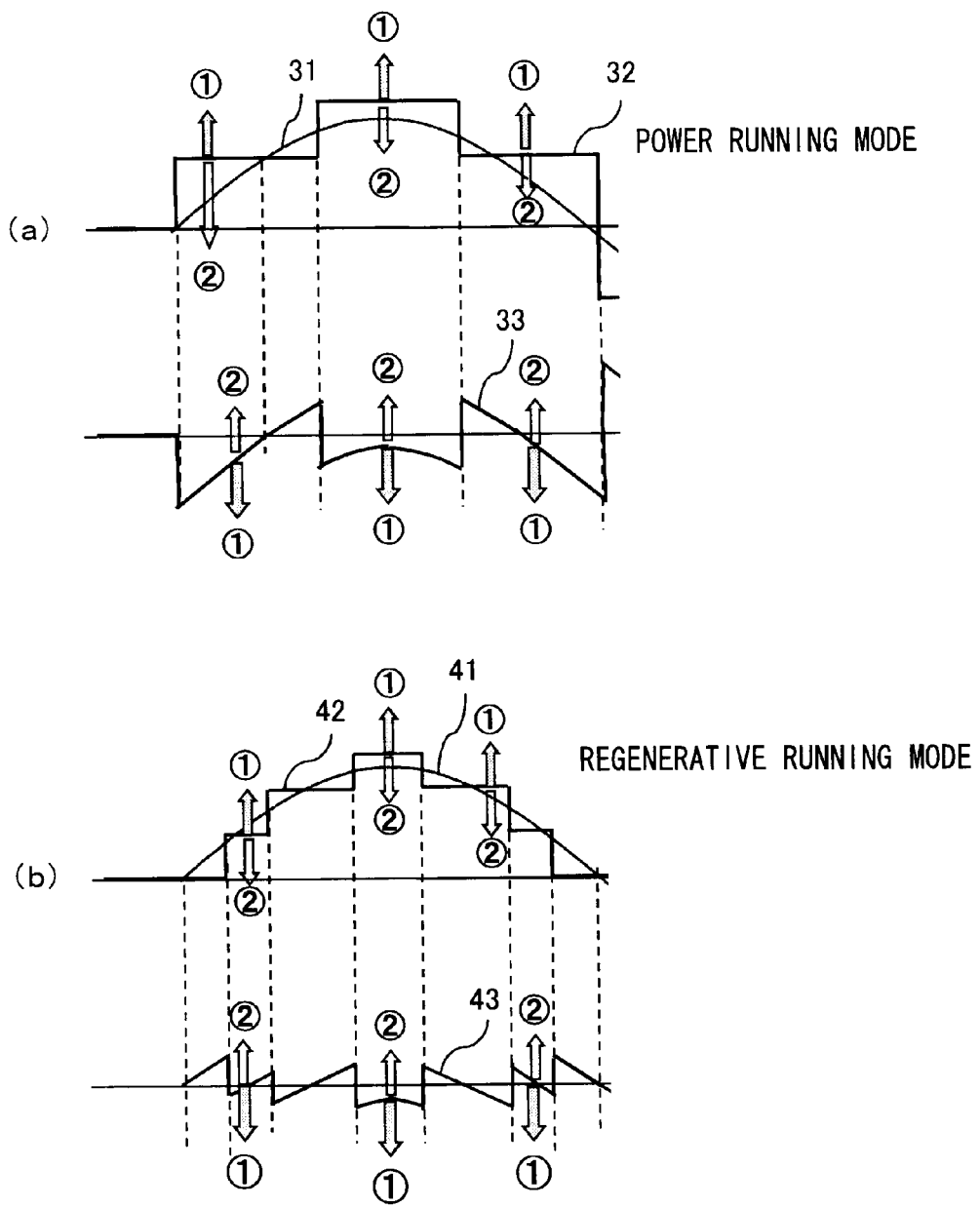
FIG. 9 is a representation of waveform charts for explaining the control operation of FIG. 8.

Described below with reference to FIG. 9 is how the DC voltage Vb of each sub-converter 3 is controlled by adjusting the filter capacitor voltage Vc of the filter capacitor 4 of the main converter 2. FIG. 9(a) shows a situation during power running mode and FIG. 9(b) shows a situation during the regenerative running mode. In either of these Figures, an upper side shows a phase voltage produced at an AC terminal of the main converter 2 and a lower side shows a phase voltage produced at an AC terminal of each sub-converter 3. The phase voltage produced by the main converter 2 shows waveforms as depicted in the Figures due to variations in potential at a neutral point.

If it is desired to increase the DC voltage Vb of the sub-converters 3 in the power running mode, the DC voltage Vc of the main converter 2 should be increased as shown in FIG. 9(a). Specifically, if the DC voltage Vc of the main converter 2 is increased so that the DC voltage Vc varies in a direction of (1), a phase voltage 32 of the main converter 2 increases and a phase voltage 33 produced by each sub-converter 3 to fill up a difference between the phase voltage 32 of the main converter 2 and a phase voltage 31 of the power system 1 decreases. Since the line currents flowing in the power converter 7 and the line voltages 33 are of the same polarity, electric power that the sub-converters 3 return to the AC input terminals thereof becomes negative and the DC voltage Vb of each sub-converter 3 becomes higher. Conversely, if it is desired to decrease the DC voltage Vb of the sub-converters 3 in the power running mode, the DC voltage Vc of the main converter 2 should be decreased so that the DC voltage Vc varies in a direction of (2).

If it is desired to increase the DC voltage Vb of the sub-converters 3 in the regenerative running mode, the DC voltage Vc of the main converter 2 should be decreased as shown in FIG. 9(b). Specifically, if the DC voltage Vc of the main converter 2 is decreased so that the DC voltage Vc varies in the direction of (2), phase voltage 42 of the main converter 2 decreases and phase voltage 43 produced by the sub-converters 3 to fill up a difference between the phase voltage 42 of the main converter 2 and phase voltage 41 of the power system 1 increases. Since the line currents flowing in the power converter 7 and the line voltages 41 are of opposite polarities, electric power that the sub-converters 3 return to the AC input terminals thereof becomes negative and the DC voltage Vb of each sub-converter 3 becomes higher. Conversely, if it is desired to decrease the DC voltage Vb of the sub-converters 3 in the regenerative running mode, the DC voltage Vc of the main converter 2 should be increased so that the DC voltage Vc varies in the direction of (1).

The DC voltage command value Vc0 generation routine 23 calculates the amount of change of the DC voltage command value Vc0 for the main converter 2 by PI control of the deviation of the DC voltage Vb from the DC voltage command value Vb0. In this process, the DC voltage command value Vc0 generation routine 23 judges whether the apparatus is in the power running mode or regenerative running mode based on current command amplitude Is0 acquired from the voltage command generation routine 24 in a succeeding stage and determines the sign (plus or minus) of the amount of change of the DC voltage command value Vc0. Then, the DC voltage command value Vc0 generation routine 23 adds this amount of change to an initial value Vc00 of the DC voltage command value and outputs the DC voltage command value Vc0 for the main converter 2. This DC voltage command value Vc0 is input into the voltage command generation routine 24.

Figure 10:
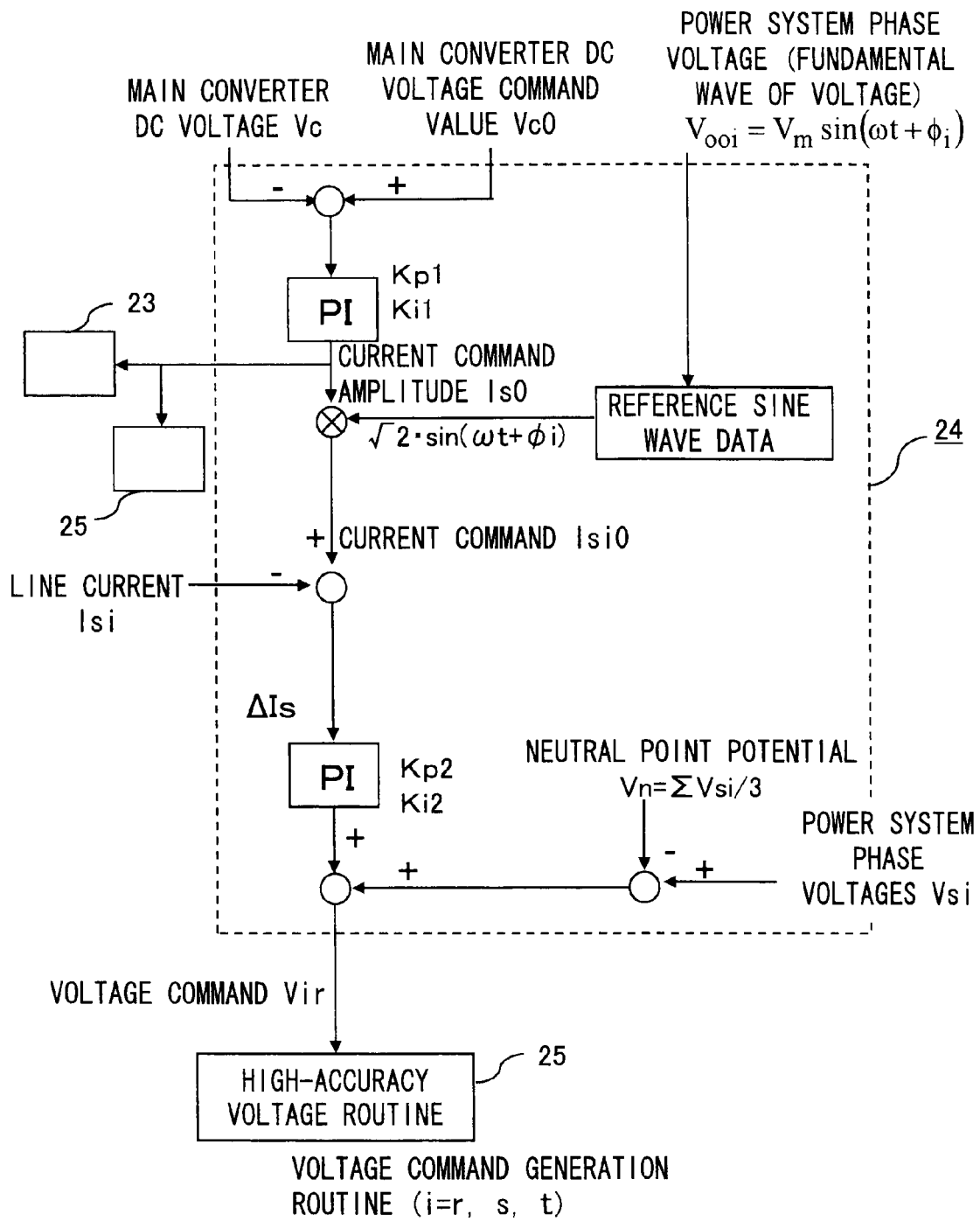
FIG. 10 is a flowchart showing part of the control operation performed by the power converting apparatus according to the first embodiment of the present invention.

FIG. 10 is a flowchart showing processing steps performed in the voltage command generation routine 24. The voltage command generation routine 24 includes the processing steps performed for each phase to generate a line current command Isi0 (i=r, s, t) by feedback control of the DC voltage Vc of the main converter 2 and further generate the voltage command Vir (i=r, s, t) for the power converter 7 by feedback control of a line current Isi (i=r, s, t).

First, the voltage command generation routine 24 determines the current command amplitude Is0 for each line current by PI control of a deviation thereof so that the DC voltage Vc of the main converter 2 follows the DC voltage command value Vc0. The voltage command generation routine 24 generates the line current command Isi0 (i=r, s, t) from the product of the current command amplitude Is0 and the fundamental wave of line voltage Vooi (i=r, s, t). Then, the voltage command generation routine 24 calculates the amount of change of the power system's phase voltage Vsi (i=r, s, t) by PI control of a deviation of the line current Isi so that the measured line current Isi follows the current command Isi0 and generates the voltage command Vir by adding the calculated amount of change to the phase voltage Vsi. As previously mentioned, the voltage command generation routine 24 calculates and uses the phase voltage Vsi as the voltage from the neutral point potential taking into consideration variations in the neutral point potential. The voltage command Vir thus generated is input into the high-accuracy voltage routine 25. The current command amplitude Is0 is also input into the high-accuracy voltage routine 25 and the DC voltage command value Vc0 generation routine 23 in a preceding stage.

Figure 11:
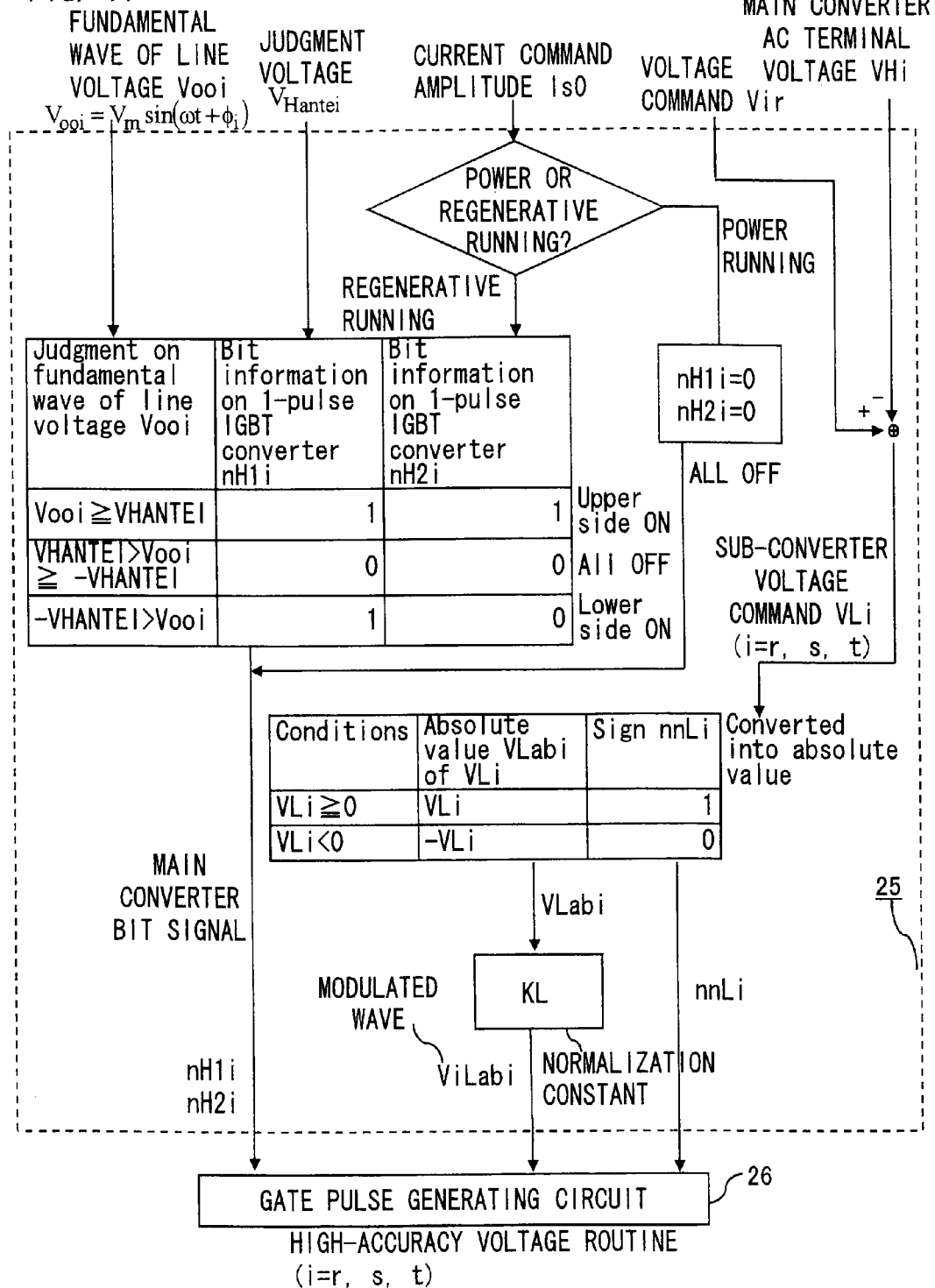
FIG. 11 is a flowchart showing part of the control operation performed by the power converting apparatus according to the first embodiment of the present invention.

FIG. 11 is a flowchart showing processing steps performed in the high-accuracy voltage routine 25. The high-accuracy voltage routine 25 determines switching states of the main converter 2 and the individual sub-converters 3 and generates the control signals therefor.

First, in operation concerning the main converter 2, the high-accuracy voltage routine 25 judges whether the power converting apparatus is in the power running mode or the regenerative running mode from the current command amplitude Is0. In the power running mode, the main converter 2 works as a 3-phase, full-wave rectification circuit so that all of the switching states may be OFF and, in this case, two pieces of bit information nH1i, nH2i (i=r, s, t) used as the control signals for the main converter 2 are set to 0. In the regenerative running mode, the high-accuracy voltage routine 25 determines the two pieces of bit information nH1, nH2 as shown in a truth table at left in the Figure from the input fundamental wave of line voltage Vooi (i=r, s, t) and the judgment voltage VHantei.

In operation concerning the sub-converters 3, the high-accuracy voltage routine 25 determines a voltage command VLi (i=r, s, t) for each sub-converter 3 from a difference between the voltage command Vir for the power converter 7 and a phase voltage VHi (i=r, s, t) which is an AC terminal voltage of the main converter 2. Then, the high-accuracy voltage routine 25 determines an absolute value VLabi and sign nnLi (i=r, s, t) of the voltage command VLi for each sub-converter 3 as the control signal therefor as shown in a truth table at right in the Figure.

The control signals thus generated for the individual converters 2, 3 are input into the gate pulse generating circuit 26.

The gate pulse generating circuit 26 generates the gate pulses for driving the switching devices in the individual converters 2, 3 based on the control signals corresponding to the voltage commands for the individual converters 2, 3 input from the high-accuracy voltage routine 25. At this time, the gate pulse generating circuit 26 also generates dead time of the gate signals for preventing short-circuiting of the arms.

In a process of generating the gate pulses for the sub-converters 3, the gate pulse generating circuit 26 generates the gate pulses in such a way as to produce a voltage of the voltage command VLi for each sub-converter 3 that is the difference between the voltage command Vir for the power converter 7 and the phase voltage VHi of the main converter 2 with high accuracy by using a comparator circuit for performing PWM control operation.

Since the gate pulse generating circuit 26 is required to have a relatively high-speed processing capability, the gate pulse generating circuit 26 is usually configured with a logic circuit capable of performing parallel processing. Alternatively, however, the processing may be performed by software by use of a central processing unit (CPU) and a digital signal processor (DSP) having a high-speed processing capability, for example.

When the power converting apparatus is controlled to produce the same voltage as the power system voltage on the AC side, the DC voltage Vb of the filter capacitor 5 of each sub-converter 3 is held at a constant level by adjusting the DC voltage Vc of the filter capacitor 4 of the main converter 2 as thus far described. In this embodiment, the amount of output power per recurring cycle of each sub-converter 3 is almost zeroed to keep the DC voltage Vb of the filter capacitor 5 at the constant level. Since the power converter 7 in which the main converter 2 and each sub-converter 3 are connected in series is so controlled as to produce the same phase voltages as the phase voltages 31 of the power system, the phase voltage produced by each sub-converter 3 increases and decreases when the DC voltage Vc of the main converter 2 is adjusted. This causes the output power of each sub-converter 3 to increase and decrease correspondingly so that the DC voltage Vb of the filter capacitor 5 can be controlled to remain constant.

Figure 12:
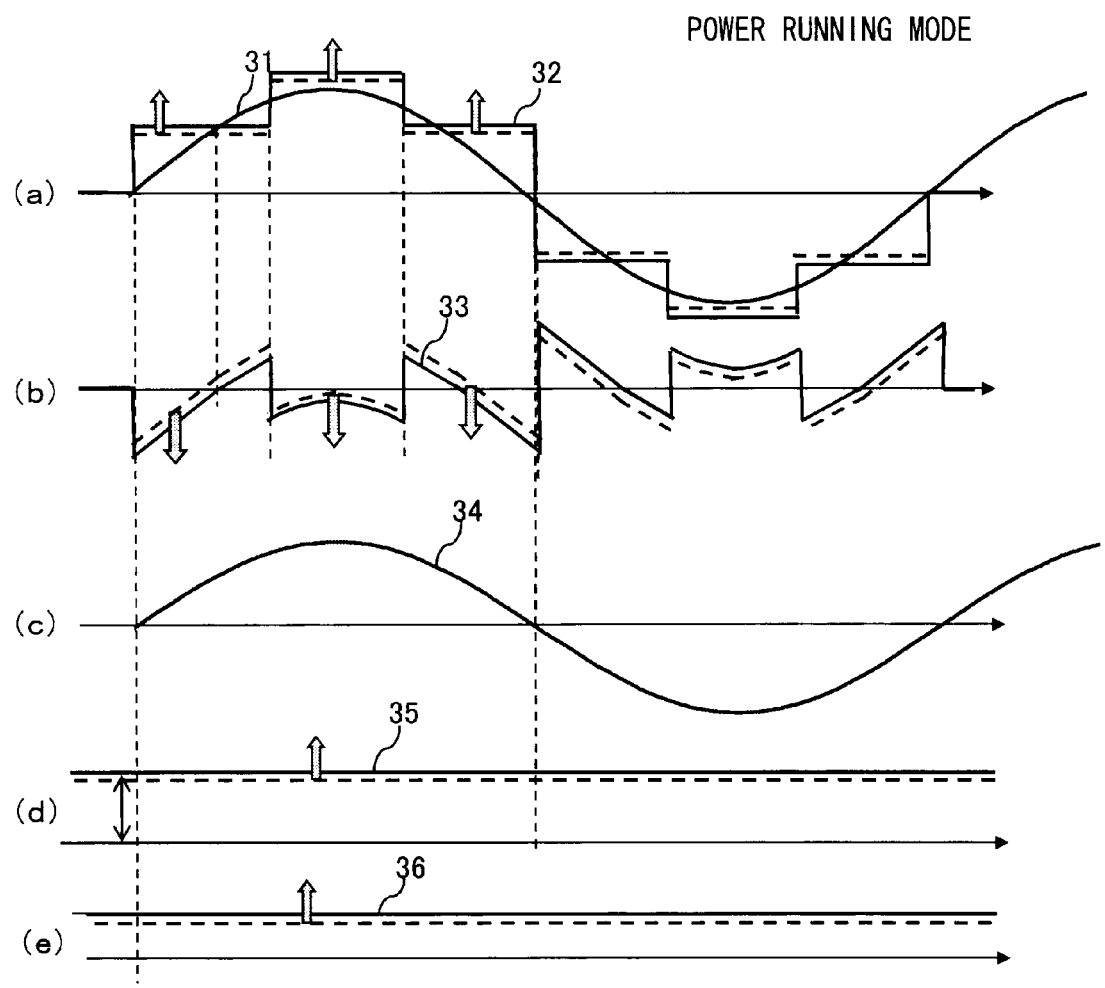
FIG. 12 is a representation of waveform charts for explaining control operation in power running mode of the power converting apparatus according to the first embodiment of the present invention.
Figure 13:
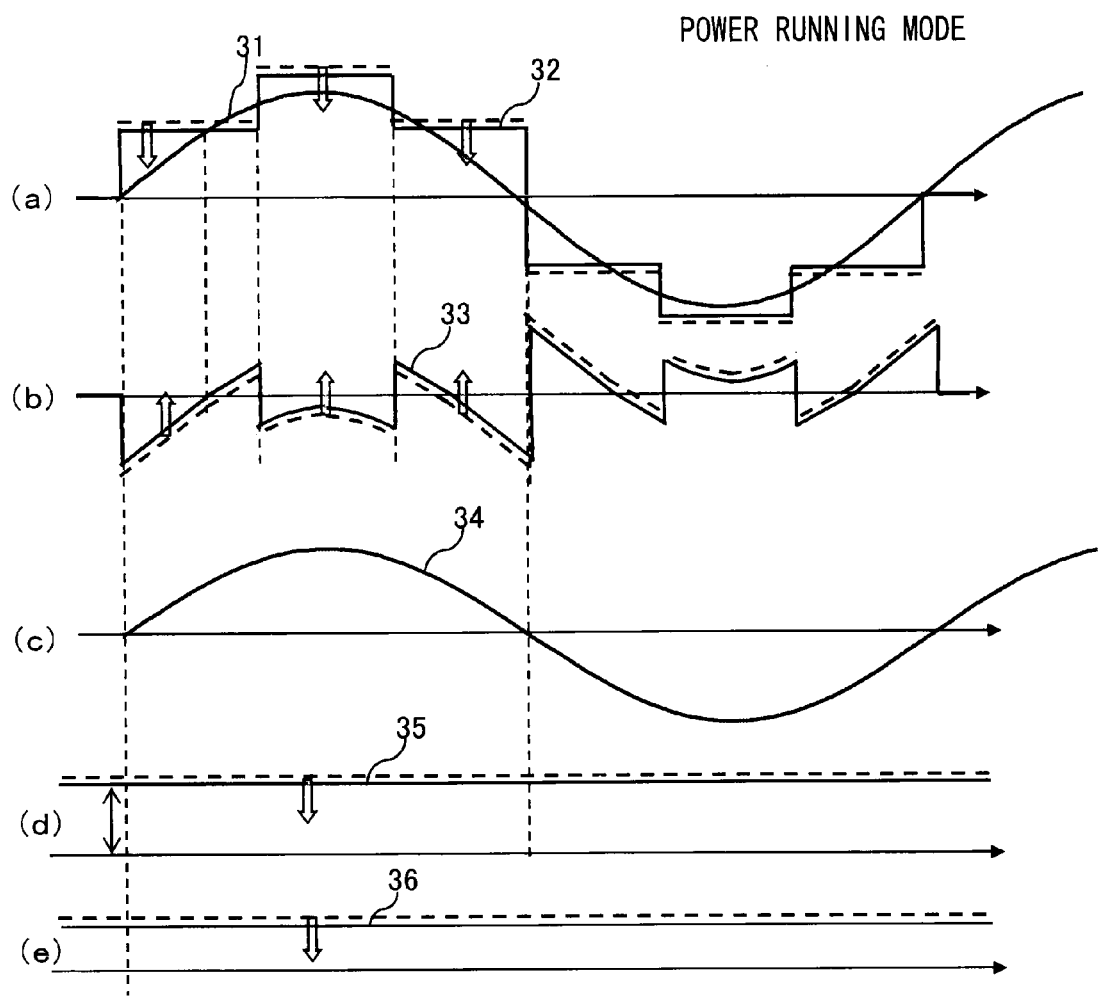
FIG. 13 is a representation of waveform charts for explaining the control operation in the power running mode of the power converting apparatus according to the first embodiment of the present invention.

FIGS. 12 and 13 show current and voltage waveforms observed in the power running mode. FIGS. 12(a) and 13(a) each show the phase voltage 31 of the power system 1 and the phase voltage 32 of the main converter 2 and FIGS. 12(b) and 13(b) each show the phase voltage 33 of each sub-converter 3. FIGS. 12(c) and 13(c) each show a line current 34, and FIGS. 12(d) and 13(d) and FIGS. 12(e) and 13(e) show the DC voltage Vc 35 of the filter capacitor 4 of the main converter 2 and the DC voltage Vb 36 of the filter capacitor 5 of each sub-converter 3, respectively.

As shown in FIG. 12, if the DC voltage Vc 35 of the main converter 2 is increased, the phase voltage 32 of the main converter 2 increases and the phase voltage 33 produced by each sub-converter 3 to fill up the difference between the phase voltage 32 of the main converter 2 and the phase voltages 31 of the power system 1 decreases. Since the line currents 34 flowing in the power converter 7 and the line voltages 31 are of the same polarity, electric power that the sub-converters 3 return to the AC input terminals thereof becomes negative and the DC voltage Vb 36 of each sub-converter 3 becomes higher. Also, as shown in FIG. 13, if the DC voltage Vc 35 of the main converter 2 is decreased, the phase voltage 32 of the main converter 2 decreases and the phase voltage 33 born by each sub-converter 3 increases. Since the line currents 34 and the line voltages 31 are of the same polarity, electric power that the sub-converters 3 return to the AC input terminals thereof becomes positive and the DC voltage Vb 36 of each sub-converter 3 becomes lower.

Figure 14:
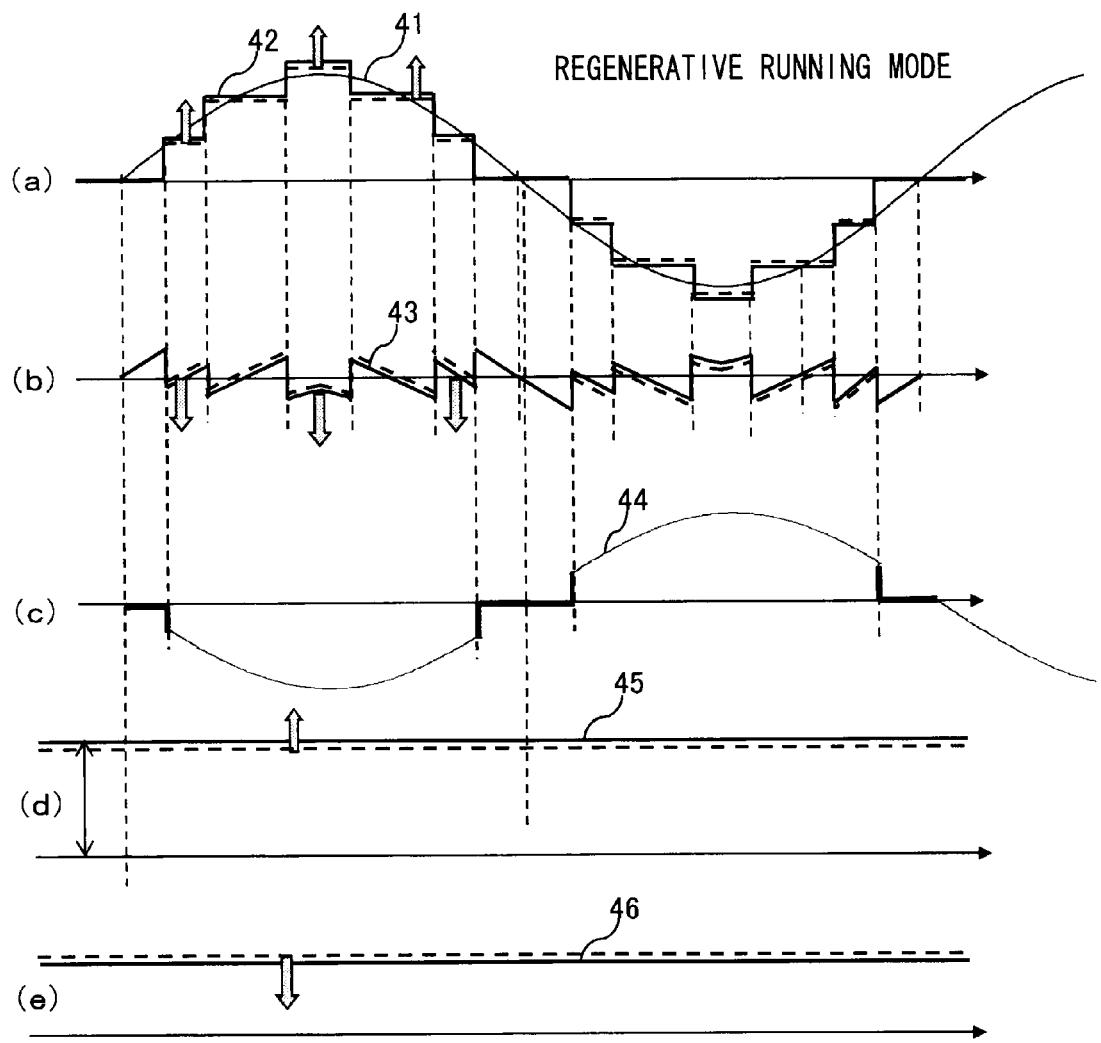
FIG. 14 is a representation of waveform charts for explaining control operation in regenerative running mode of the power converting apparatus according to the first embodiment of the present invention.
Figure 15:
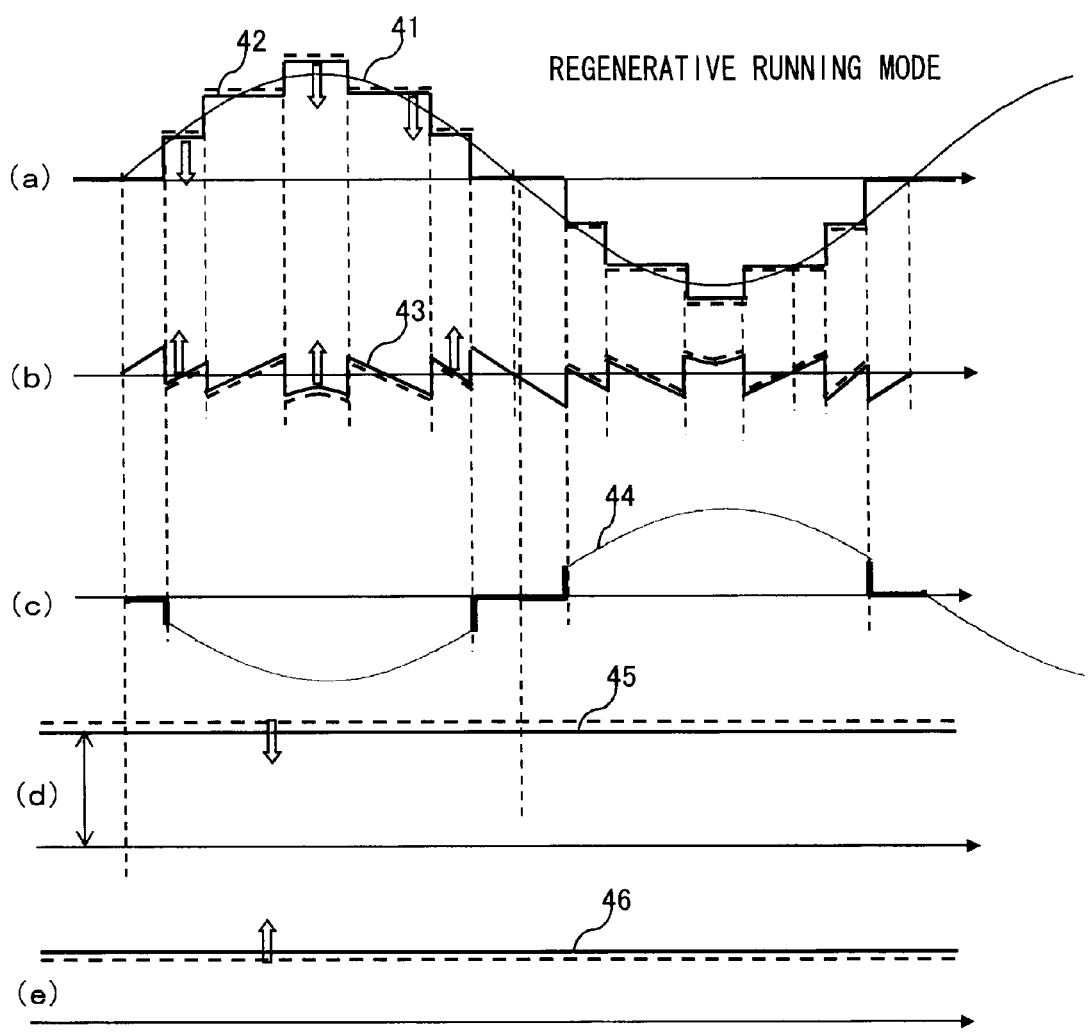
FIG. 15 is a representation of waveform charts for explaining the control operation in the regenerative running mode of the power converting apparatus according to the first embodiment of the present invention.
Figure 16:
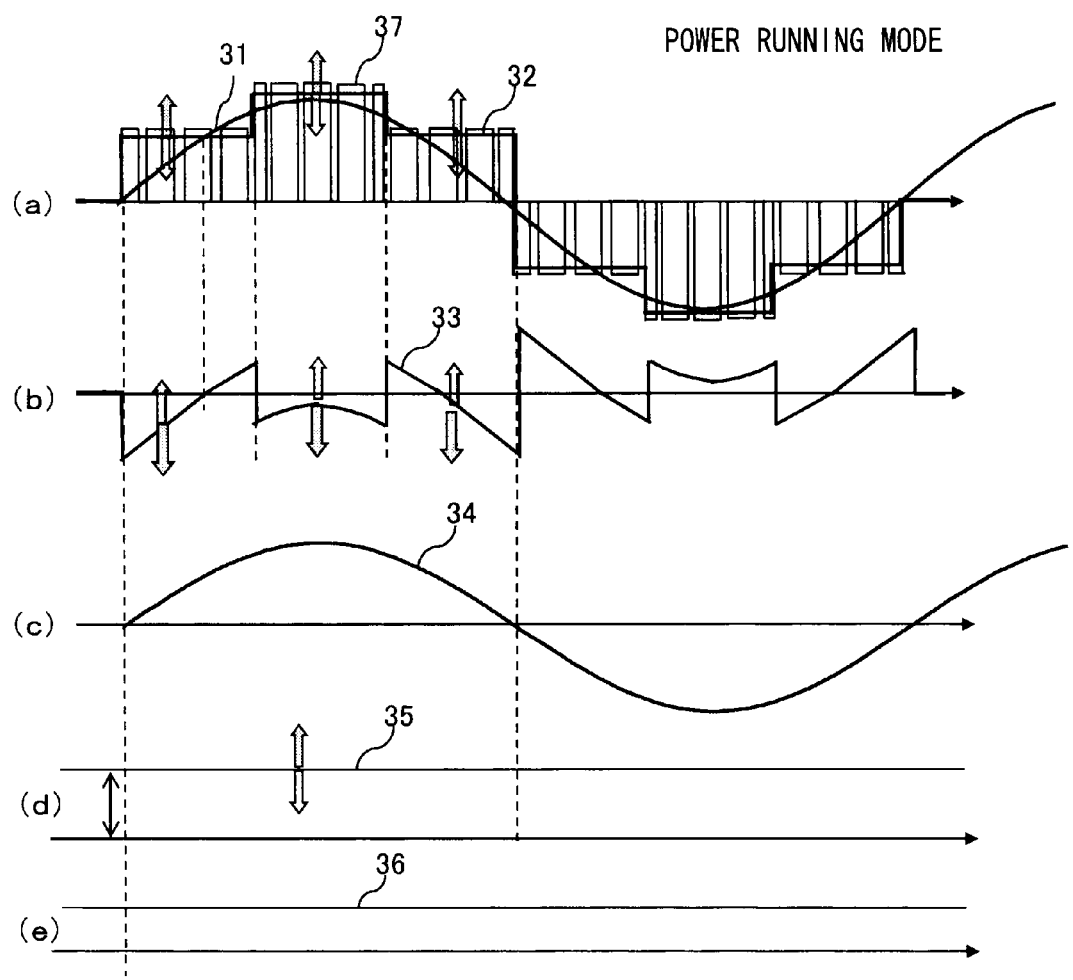
FIG. 16 is a representation of waveform charts for explaining control operation according to a variation of the first embodiment of the present invention.

FIGS. 14 and 15 show current and voltage waveforms observed in the regenerative running mode. FIGS. 14(a) and 15(a) each show the phase voltage 41 of the power system 1 and the phase voltage 42 of the main converter 2 and FIGS. 14(b) and 15(b) each show the phase voltage 43 of each sub-converter 3. FIGS. 14(c) and 15(c) each show a line current 44, and FIGS. 14(d) and 15(d) and FIGS. 14(e) and 15(e) show the DC voltage Vc 45 of the filter capacitor 4 of the main converter 2 and the DC voltage Vb 46 of the filter capacitor 5 of each sub-converter 3, respectively.

As shown in FIG. 14, if the DC voltage Vc 45 of the main converter 2 is increased, the phase voltage 42 of the main converter 2 increases and the phase voltage 43 produced by each sub-converter 3 to fill up the difference between the phase voltage 42 of the main converter 2 and the phase voltages 41 of the power system 1 decreases. Since the line currents 44 flowing in the power converter 7 and the line currents 41 are of opposite polarities, electric power that the sub-converters 3 return to the AC input terminals thereof becomes positive and the DC voltage Vb 46 of each sub-converter 3 becomes lower. Also, as shown in FIG. 15, if the DC voltage Vc 45 of the main converter 2 is decreased, the phase voltage 42 of the main converter 2 decreases and the phase voltage 43 born by each sub-converter 3 increases. Since the line currents 44 and the line voltages 43 are of opposite polarities, electric power that the sub-converters 3 return to the AC input terminals thereof becomes negative and the DC voltage Vb 46 of each sub-converter 3 becomes higher.

By performing the above-described control operation, it is possible to keep the DC voltage Vb of the filter capacitor 5 of each sub-converter 3 at a constant level and eliminate the need for a DC power supply for supplying electricity to the filter capacitors 5. It is therefore possible to make the power converting apparatus in a compact and simple structure and improve reliability thereof. Although the power converting apparatus may be provided with a DC power supply having a regenerating function for supplying electricity to the filter capacitors 5, a DC power supply with a small supply capacity will suffice.

Also, since the power converter 7 is configured with the main converter 2 and each sub-converter 3 connected in series to generate phase voltages of the power converter 7 as the sums of phase voltages of the individual converters 2, 3, it is not necessary to generate high-voltage pulses at a high switching frequency, and it is possible to suppress harmonics without increasing the size of a reactor in the power system and reduce power loss and electromagnetic noise. Accordingly, a power converting apparatus which offers high power conversion efficiency in a highly compact design is obtained.

In particular, if the main converter 2 which handles high voltages is operated with a reduced number of pulses and the sub-converters 3 which handle low voltages are controlled by PWM, advantageous effects will be obtained with respect to both improvement of power conversion efficiency and suppression of harmonics.

While the phase voltages of the main converter 2 are increased or decreased by adjusting the DC voltage Vc of the filter capacitor 4 of the main converter 2 in the above-described first embodiment, the power converting apparatus may be so configured as to generate voltage pulses 37 by controlling the main converter 2 by PWM to vary the magnitude of the phase voltages 32 of the main converter 2 on average. It is possible to control the apparatus so that the output power per recurring cycle of each sub-converter 3 becomes approximately zero by varying also the phase voltage 33 of each sub-converter 3 correspondingly. In this case, it is possible to hold the DC voltage Vb 36 of the filter capacitor 5 of each sub-converter 3 at a constant level by keeping the DC voltage Vc 35 of the main converter 2 constant.

Second Embodiment

Figure 17:
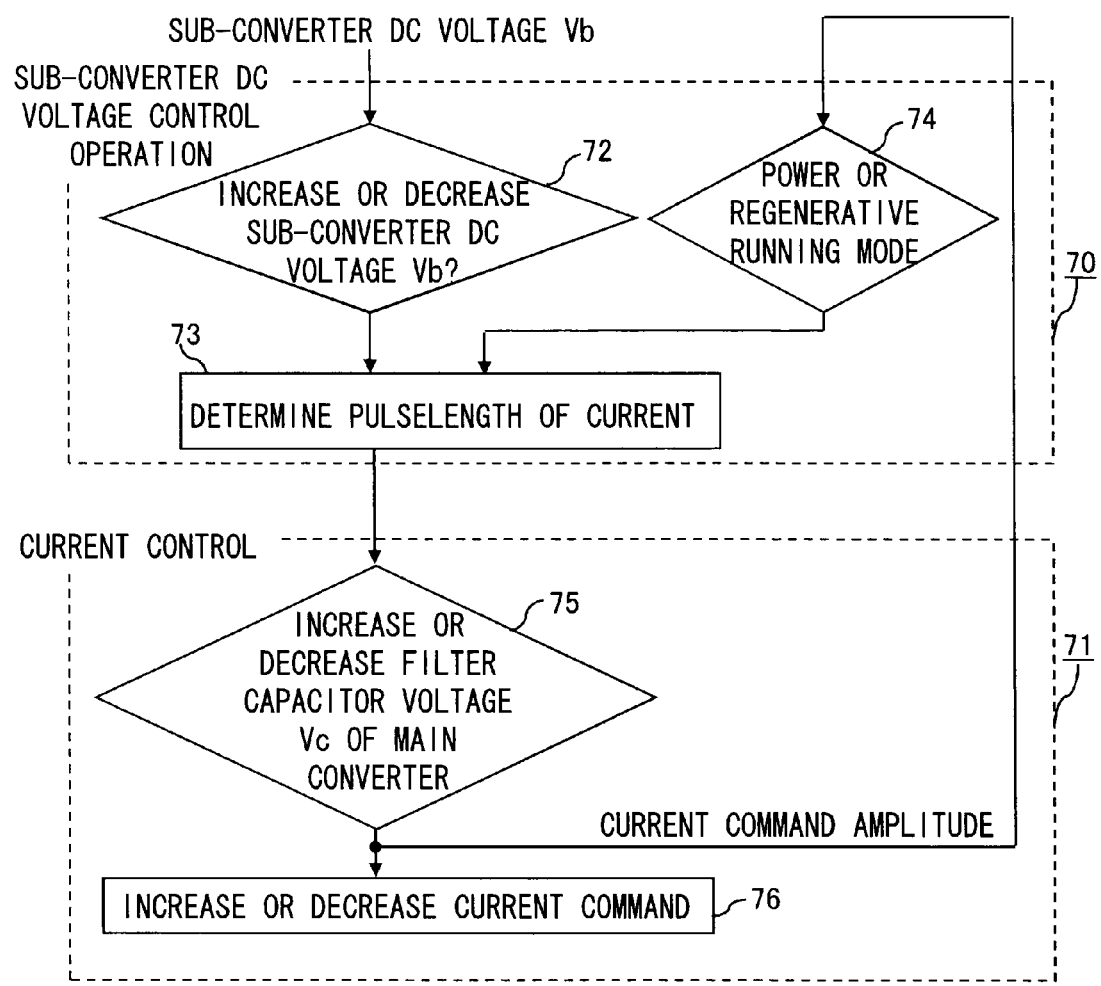
FIG. 17 is a diagram showing a flow of control operation of a power converting apparatus according to a second embodiment of the present invention.

FIG. 17 is a diagram showing a flow of control operation of a power converting apparatus according to a second embodiment of the present invention. A main circuit configuration of the power converting apparatus of the second embodiment is essentially the same as that of the first embodiment shown in FIGS. 1 and 2.

In sub-converter DC voltage control operation 70, the apparatus compares the measured DC voltage Vb of each sub-converter 3 with the set DC voltage command value Vb0 and determines whether to increase or decrease the DC voltage Vb (step 72). Then, the apparatus judges whether the apparatus is in now in the power running mode or the regenerative running mode based on an input current command amplitude for the line current (step 74), and determines and outputs the pulselength of the line current (step 73). In current control operation 71, the apparatus determines whether to increase or decrease the DC voltage Vc of the main converter 2 (step 75), increases or decreases the current command amplitude correspondingly, inputs the same into step 74, and increases or decreases the current command as well (step 76).

In this control operation, the apparatus is controlled such that the output power per recurring cycle of each sub-converter 3 becomes approximately zero per recurring cycle and the DC voltage Vb of each sub-converter 3 remains constant by adjusting an output period (pulselength) and waveform of the line current.

Figure 18:
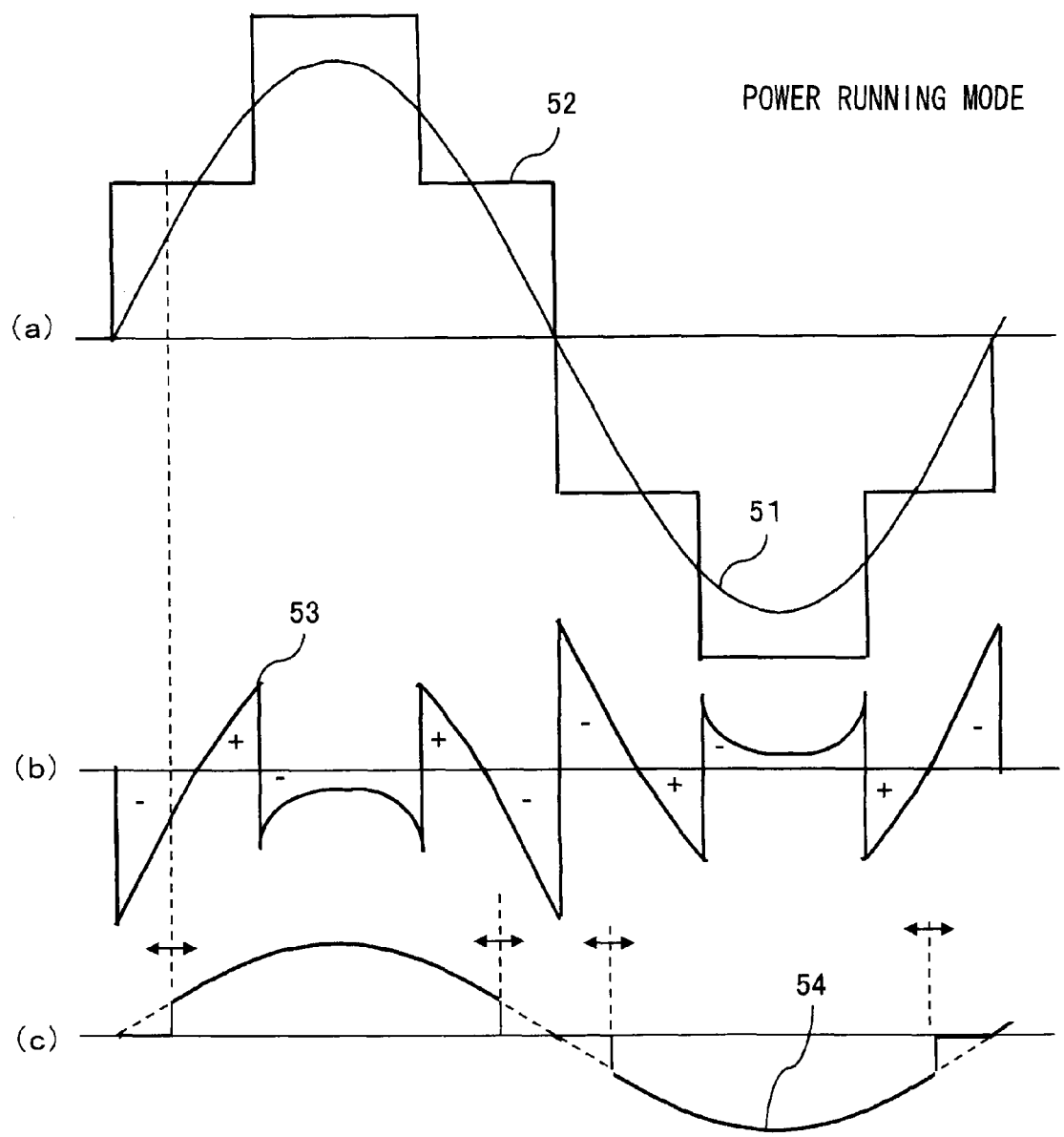
FIG. 18 is a representation of waveform charts for explaining control operation in the power running mode of the power converting apparatus according to the second embodiment of the present invention.
Figure 19:
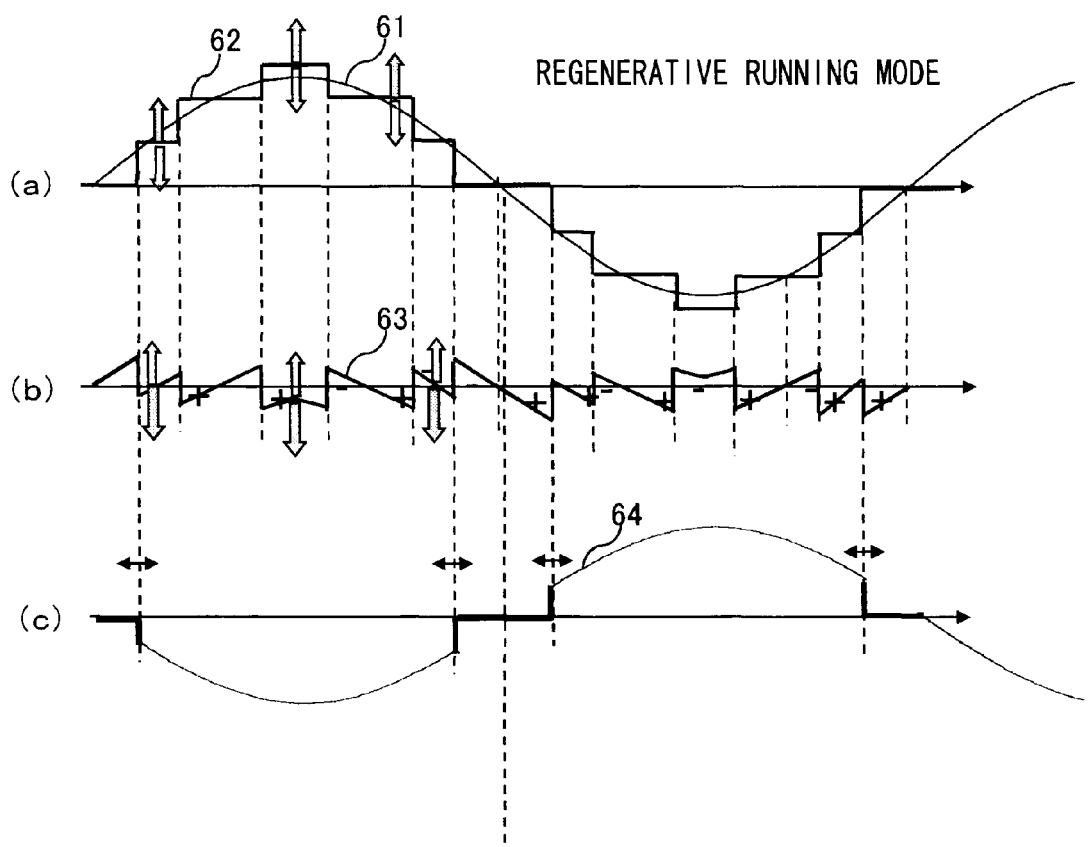
FIG. 19 is a representation of waveform charts for explaining control operation in the regenerative running mode of the power converting apparatus according to the second embodiment of the present invention.

FIG. 18 shows current and voltage waveforms observed in the power running mode, and FIG. 19 shows current and voltage waveforms observed in the regenerative running mode. Phase voltages 53, 63 output from the sub-converters 3 by PWM control operation are differences between phase voltages 51, 61 of the power system 1 and phase voltages 52, 62 of the main converter 2, respectively.

In the power running mode, the output power of each sub-converter 3 expressed by the product of the phase voltage 53 of each sub-converter 3 and line current 54 can be approximately zeroed per recurring cycle by adjusting the pulselength in each recurring cycle of the line current 54.

In the regenerative running mode, line currents 64 do not flow as the switching devices of the main converter 2 are turned off. Specifically, the line currents 64 do not flow when the phase voltage 62 of the main converter 2 is zero. Therefore, it is possible to adjust the output power per recurring cycle of each sub-converter 3 to become approximately zero by adjusting the pulselength in each recurring cycle of the line current 64.

In this embodiment, it is also possible to control the DC voltage Vc of the main converter 2 by increasing or decreasing the current command amplitude of the line current.

In the second embodiment, it is also possible to keep the DC voltage Vb of the filter capacitor 5 of each sub-converter 3 at a constant level and eliminate the need for a DC power supply for supplying electricity to the filter capacitors 5. It is therefore possible to make the power converting apparatus in a compact and simple structure and improve reliability thereof. Although the power converting apparatus may be provided with a DC power supply having a regenerating function for supplying electricity to the filter capacitors 5, a DC power supply with a small supply capacity will suffice.

Also, since the power converter 7 is configured with the main converter 2 and each sub-converter 3 connected in series to generate phase voltages of the power converter 7 as the sums of phase voltages of the individual converters 2, 3, it is not necessary to generate high-voltage pulses at a high switching frequency, and it is possible to suppress harmonics without increasing the size of a reactor in the power system and reduce power loss and electromagnetic noise. Accordingly, a power converting apparatus which offers high power conversion efficiency in a highly compact design is obtained.

Third Embodiment

Next, a power converting apparatus according to a third embodiment of the present invention is described with reference to the drawings.

A main circuit configuration of the power converting apparatus of the third embodiment is essentially the same as that of the first embodiment shown in FIGS. 1 and 2. While it is necessary to take measures for stabilizing voltages of the filter capacitors 5 of the sub-converters 3, a description of the measures is omitted here for the sake of simplification, assuming that the voltages are already stabilized.

Figure 20:
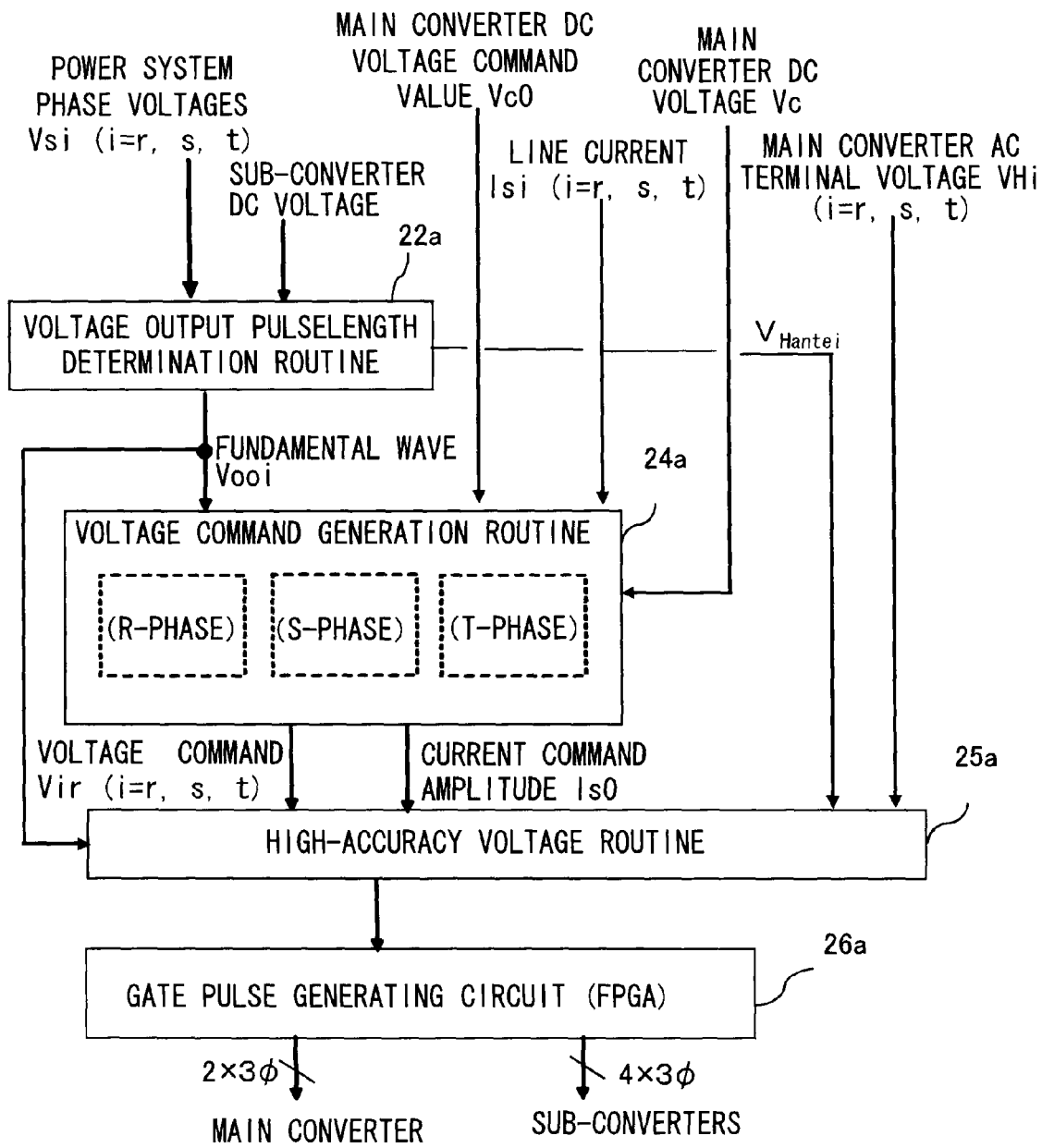
FIG. 20 is a diagram showing an overall flow of control operation of the power converting apparatus according to a third embodiment of the present invention.

FIG. 20 is a diagram showing an overall flow of control operation of the power converting apparatus according to the third embodiment.

As shown in FIG. 20, a voltage output pulselength determination routine 22a derives a fundamental wave Vooi of the power system voltage from measured phase voltages Vsi (i=r, s, t) of the power system 1, determines the pulselength of a gate signal for driving each switching device in the main converter 2 from the filter capacitor voltage (DC voltage) Vb of each sub-converter 3, and outputs a judgment voltage VHantei which is the value of a fundamental wave of voltage corresponding to this pulselength.

Also, a voltage command generation routine 24a generates a voltage command (input voltage command) Vir (i=r, s, t) for voltages produced on the AC side of the power converter 7 to control line currents so that the DC voltage Vc of the main converter 2 matches the DC voltage command value Vc0. A high-accuracy voltage routine 25a generates control signals corresponding to the voltage commands for the individual converters 2, 3 based on the voltage command Vir (i=r, s, t) given to the power converter 7. At this time, the main converter 2 generates a one pulse line-to-line voltage per half wave of the power system's line-to-line voltage, and the high-accuracy voltage routine 25a generates the control signals for the main converter 2 and the sub-converters 3 so that the voltage produced on the AC side of the power converter 7 equals the power system voltage. A gate pulse generating circuit (logic circuit) 26a receives the control signals corresponding to the voltage commands for the individual converters 2, 3 from the high-accuracy voltage routine 25a and generates gate pulses for driving the switching devices in the individual converters 2, 3.

Control operations performed by the individual elements 22a, 24a-26a shown in FIG. 20 are described in detail below.

Figure 21:
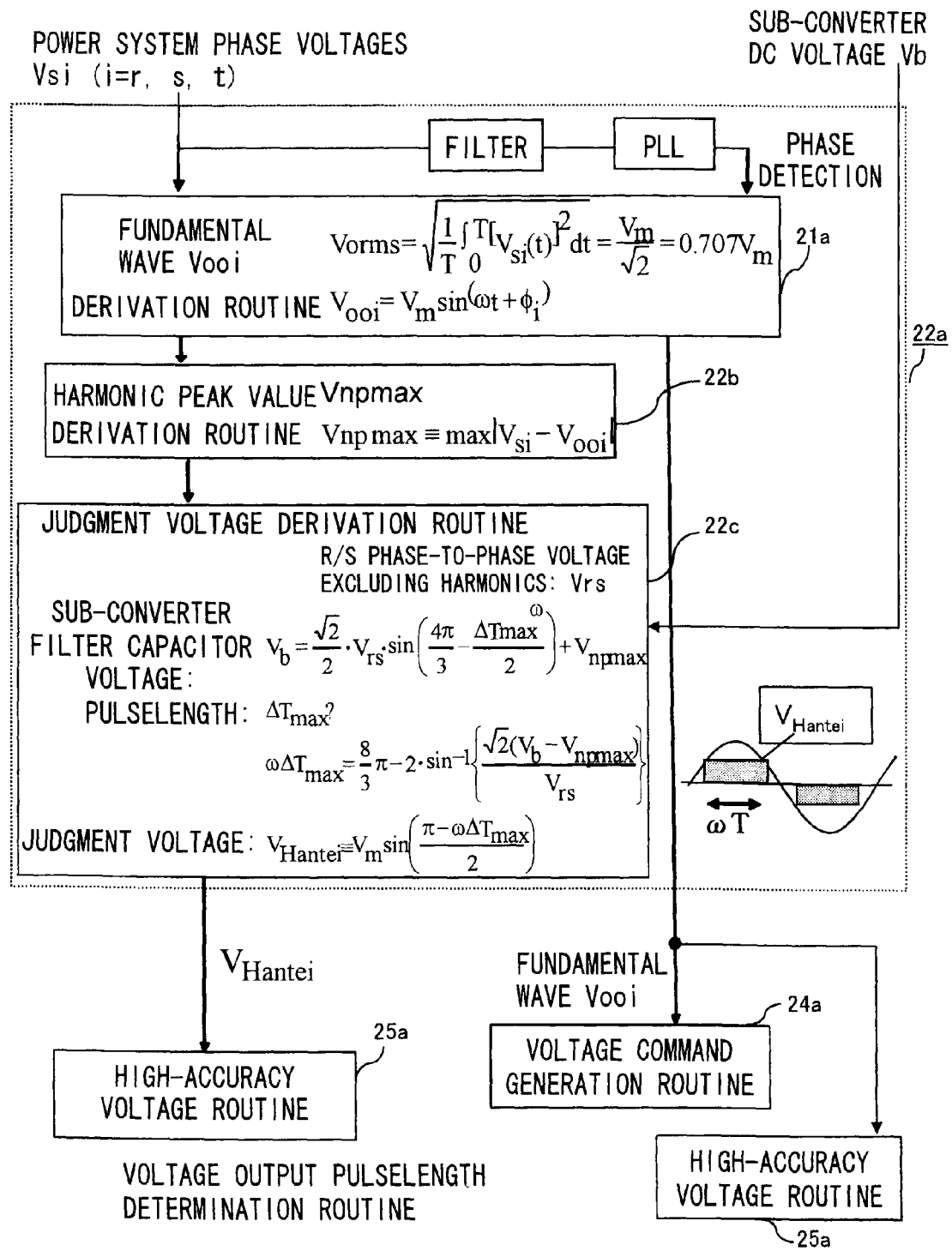
FIG. 21 is a flowchart showing part of the control operation performed by the power converting apparatus according to the third embodiment of the present invention.

FIG. 21 is a flowchart showing processing steps performed in the voltage output pulselength determination routine 22a. As shown in the Figure, the voltage output pulselength determination routine 22a includes a fundamental wave derivation routine 21a, a harmonic peak value Vnpmax derivation routine 22b and a judgment voltage derivation routine 22c.

First, the voltage output pulselength determination routine 22a detects phases from the measured phase voltages Vsi (i=r, s, t) of the power system 1, and the fundamental wave derivation routine 21a calculates an rms voltage value by time-domain integration of the phase voltages Vsi and derives the fundamental wave of voltage Vooi which peaks at $\sqrt{2}$ times the rms voltage value. This fundamental wave Vooi is input into the voltage command generation routine 24a and the high-accuracy voltage routine 25a too. The harmonic peak value Vnpmax derivation routine 22b determines a peak value Vnpmax of harmonics which are differences between the fundamental wave of voltage Vooi and the measured phase voltages Vsi. The judgment voltage derivation routine 22c determines the pulselength ΔTmax of the gate signal for driving each switching device in the main converter 2 based on the DC voltage Vb of each sub-converter 3 in a manner that permits execution of a current control operation, and outputs the value of the fundamental wave of voltage Vooi corresponding to the pulselength ΔTmax as the judgment voltage VHantei. This judgment voltage VHantei is input into the high-accuracy voltage routine 25a.

The pulselength ΔTmax of gate pulses for driving each switching device in the main converter 2 is described in detail below.

Figure 22:
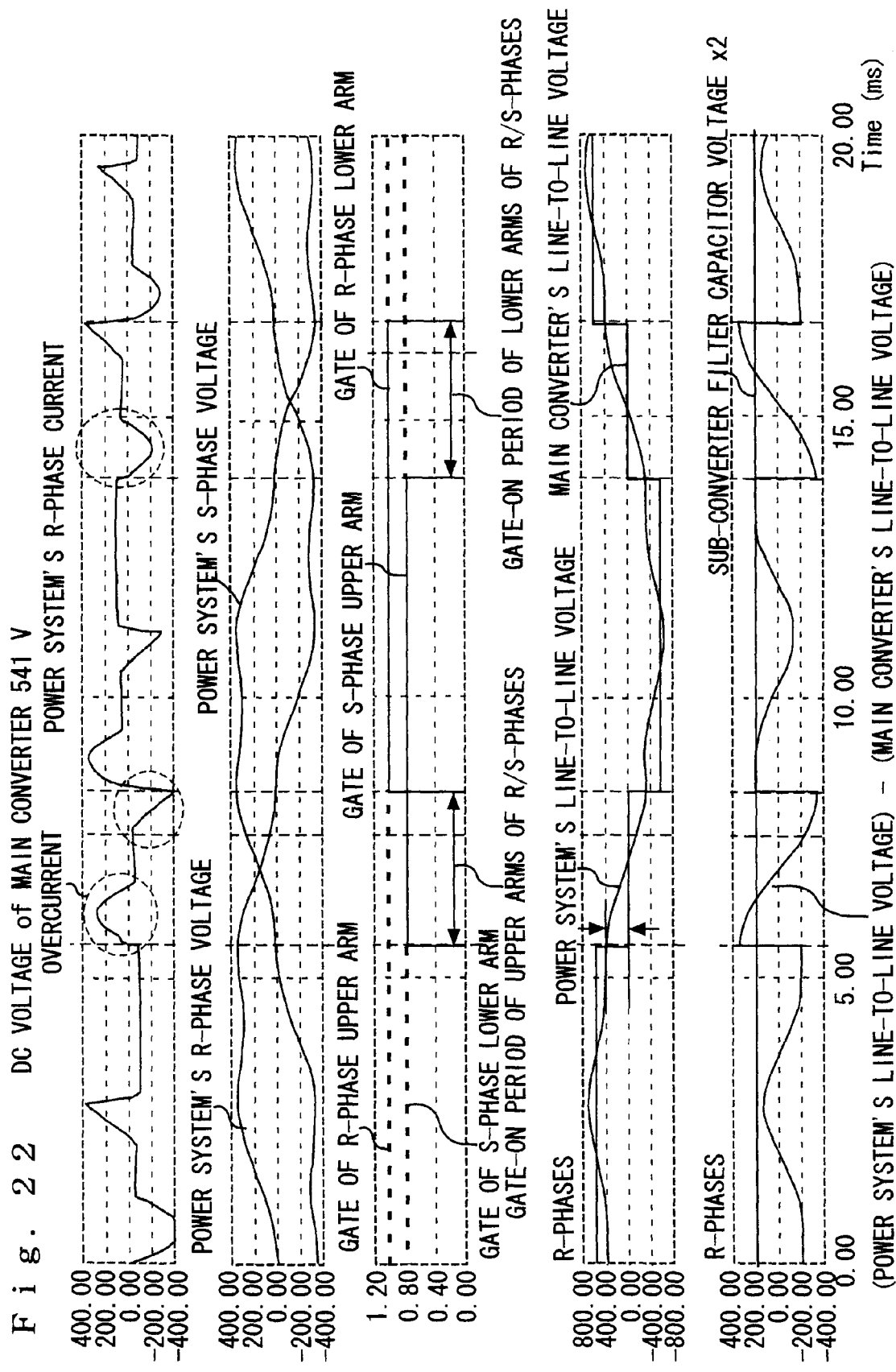
FIG. 22 is a representation of waveform charts for explaining the control operation of FIG. 21.
Figure 23:
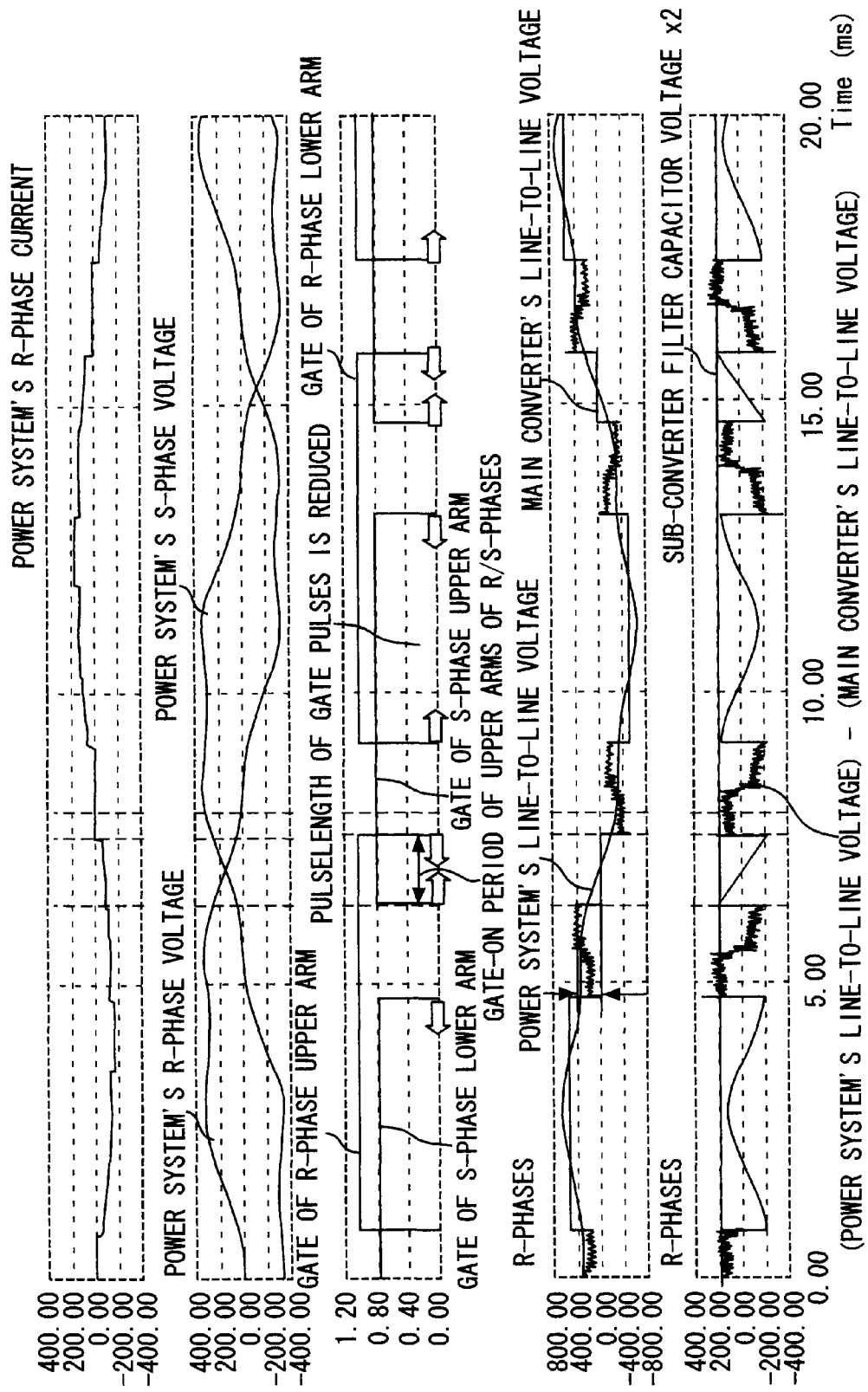
FIG. 23 is a representation of waveform charts for explaining the control operation of FIG. 21.

Described below with reference to FIGS. 22 and 23 which are waveform charts differing from those of the foregoing first embodiment is an effect of enabling the current control operation of the sub-converters 3 even at a low filter capacitor voltage by adjusting the pulselength of gate pulses for driving the switching devices in the main converter 2. In particular, FIG. 22 shows a situation before pulselength adjustment and FIG. 23 shows a situation after pulselength adjustment. Here, a pair of R- and S-phases is considered for ease of understanding.

As shown in the Figures, the main converter 2 generates a one pulse line-to-line voltage per half wave of the line-to-line voltage of the power system 1. Also, the sub-converters 3 of the R- and S-phases are so controlled by PWM as to cancel out a difference between the power system's line-to-line voltage and the line-to-line voltage of the main converter 2.

If ON times of the switching devices of the same side, that is, the positive side (upper side) or the negative side (lower side), of the R- and S-phase arms of the main converter 2 overlap during the control operation in the regenerative running mode, there is formed a short circuit passing through the elements (switching devices and diodes) of the same side with the power system's line-to-line voltage, which is the line-to-line voltage between the power system's R-phase voltage and the power system's S-phase voltage, inserted between the two phases. This overlapping period is a gate ON period of the upper (or lower) arms of the R- and S-phases shown in third rows of FIGS. 22 and 23 and, as shown in fourth rows thereof, the voltage between the R- and S-phases of the main converter 2 becomes zero during this period. This means that it is necessary to generate the power system's line-to-line voltage between the R- and S-phases by a pair of sub-converters 3 of the R- and S-phases existing in the two lines.

Fifth rows of FIGS. 22 and 23 show ((power system's line-to-line voltage)−(main converter's line-to-line voltage)) and the filter capacitor voltage of the pair of sub-converters 3 of the R- and S-phases. If ((power system's line-to-line voltage)−(main converter's line-to-line voltage)) is equal to or lower than the filter capacitor voltage of the pair of sub-converters 3 of the R- and S-phases, it is possible to control currents flowing through the power converter 7, or the line currents. FIG. 22 shows situations where ((power system's line-to-line voltage)−(main converter's line-to-line voltage)) exceeds the filter capacitor voltage of the pair of sub-converters 3 of the R- and S-phases during periods in which the main converter's line-to-line voltage becomes 0. In these situations, the current control operation becomes impossible and overcurrent events occur in a line current as shown in a first row of FIG. 22. In the case of FIG. 23, on the other hand, the pulselength of the phase voltage of the main converter 2 is reduced to shorten the gate ON period of the upper (or lower) arms of the R- and S-phases as shown in the third row, thereby making an adjustment for shortening the periods in which the main converter's line-to-line voltage becomes 0. As a consequence, in the case of FIG. 23, ((power system's line-to-line voltage)−(main converter's line-to-line voltage)) becomes equal to or lower than the filter capacitor voltage of the pair of sub-converters 3 of the R- and S-phases at all times and, thus, it is possible to control the line current to assume generally a sine wave pattern containing no overcurrent as shown in a first row of FIG. 23 even when the capacitor voltage of the sub-converters 3 is low.

The judgment voltage derivation routine 22c in the voltage output pulselength determination routine 22a determines the pulselength ΔTmax of gate pulses for driving the switching devices in the main converter 2 in the regenerative running mode so that the sum of ((power system's line-to-line voltage)−(main converter's line-to-line voltage)) and the peak value Vnpmax of harmonics becomes equal to or lower than the filter capacitor voltage of the sub-converters 3 of the two phases, and thereby adjusts the periods in which the line-to-line voltage of the main converter 2 becomes 0. Consequently, it becomes possible to control the line-to-line voltage produced on the AC side of the power converter 1 to the same level as the power system's line-to-line voltage and to control the line current.

Figure 24:
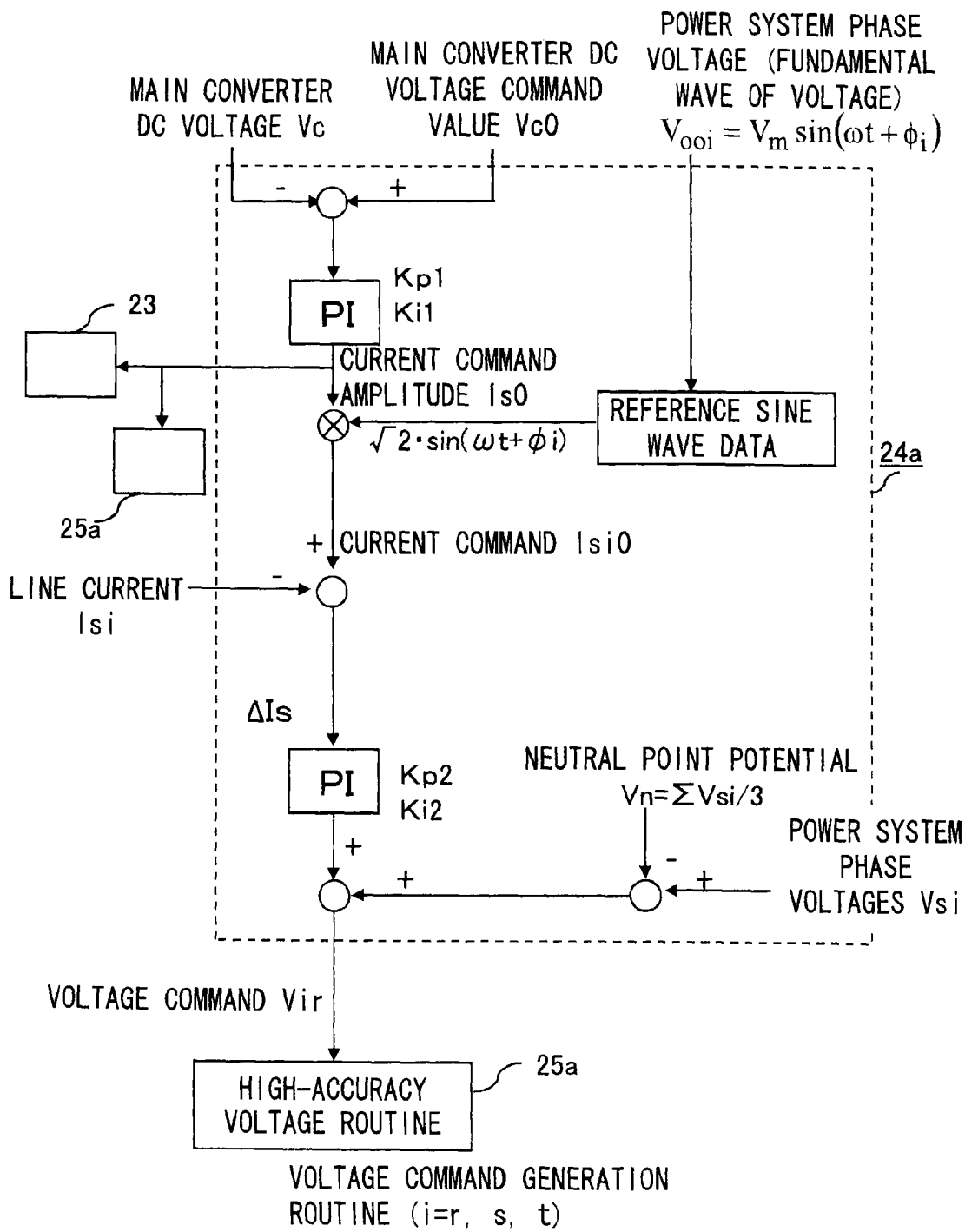
FIG. 24 is a flowchart showing part of the control operation performed by the power converting apparatus according to the third embodiment of the present invention.

FIG. 24 is a flowchart showing processing steps performed in the voltage command generation routine 24a. The voltage command generation routine 24a includes the processing steps performed for each phase to generate a line current command Isi0 (i=r, s, t) by feedback control of the DC voltage Vc of the main converter 2 and further generate the voltage command Vir (i=r, s, t) for the power converter 7 by feedback control of a line current Isi (i=r, s, t).

First, the voltage command generation routine 24a determines the current command amplitude Is0 for each line current by PI control of a deviation thereof so that the DC voltage Vc of the main converter 2 follows the DC voltage command value Vc0. The voltage command generation routine 24a generates the line current command Isi0 (i=r, s, t) from the product of the current command amplitude Is0 and the fundamental wave of line voltage Vooi (i=r, s, t). Then, the voltage command generation routine 24a calculates the amount of change of the power system's phase voltage Vsi (i=r, s, t) by PI control of a deviation of the line current Isi so that the measured line current Isi follows the current command Isi0 and generates the voltage command Vir by adding the calculated amount of change to the phase voltage Vsi. The voltage command generation routine 24a calculates and uses the phase voltage Vsi as the voltage from the neutral point potential taking into consideration variations in the neutral point potential. The voltage command Vir thus generated is input into the high-accuracy voltage routine 25a. The current command amplitude Is0 is also input into the high-accuracy voltage routine 25a.

Described below is how the DC voltage Vc of the main converter 2 is controlled by varying the line current Isi.

Figure 25:
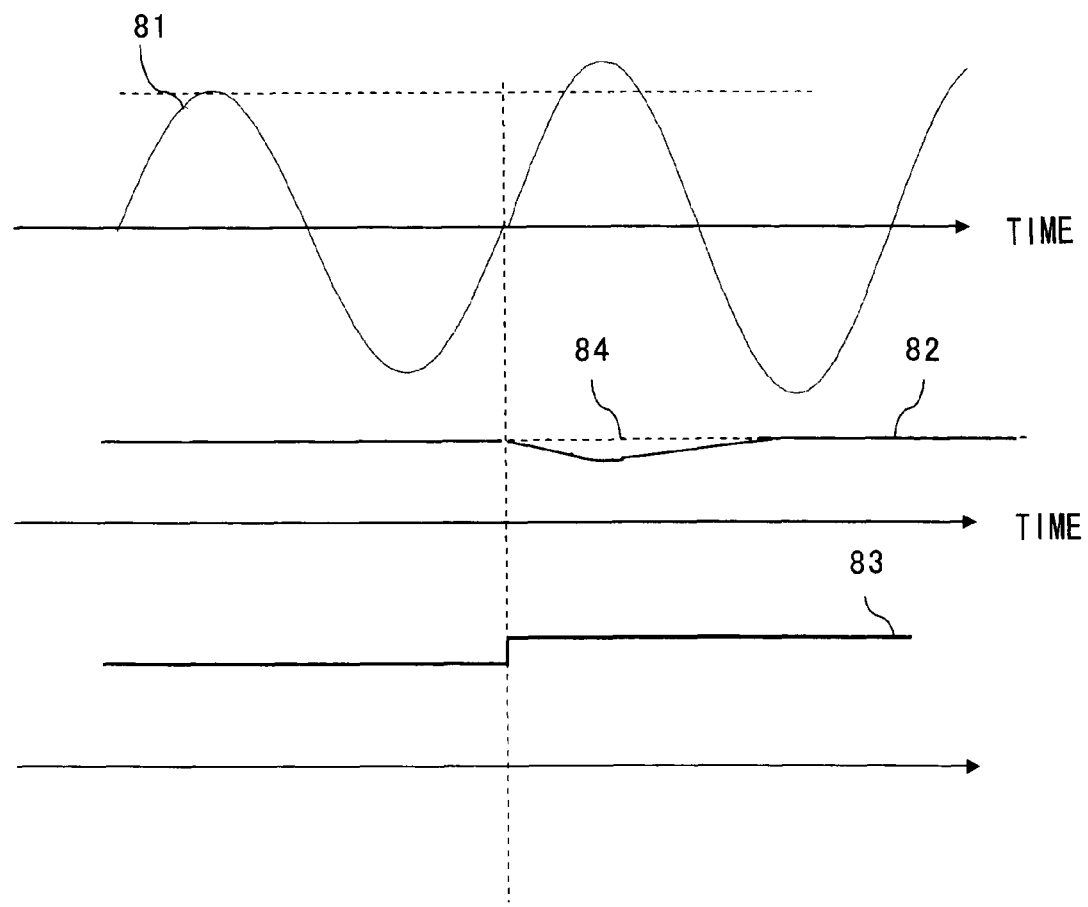
FIG. 25 is a representation of waveform charts for explaining the control operation of FIG. 24.

The voltage command generation routine 24a determines the current command amplitude Is0 for each line current by proportional-integral control of the deviation thereof so that the filter capacitor voltage (DC voltage Vc) of the main converter 2 follows the DC voltage command value Vc0 as mentioned above. If importance is to be placed on reducing harmonic current components contained in the AC line currents, the line current command Isi0 should be the product of the calculated current command amplitude Is0 and a fundamental wave (trigonometric function) of the power system voltage. For example, although a filter capacitor voltage 82 of the main converter 2 once decreases when load power 83 increases, the filter capacitor voltage 82 approaches a target voltage value 84 if the amplitude of a line current command value 81 (line current command Isi0) is increased as shown in FIG. 25.

Figure 26:
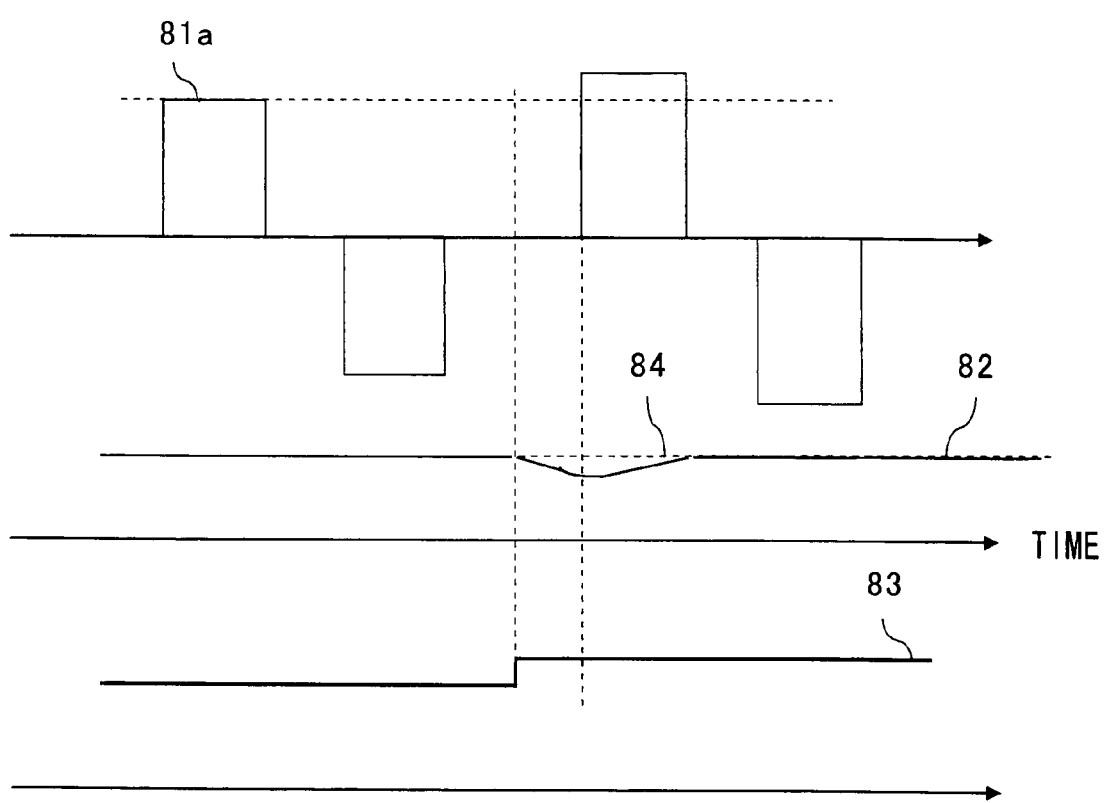
FIG. 26 is a representation of waveform charts for explaining a variation of the control operation of FIG. 24.

While the product of the current command amplitude Is0 and the fundamental wave (trigonometric function) of the power system voltage is set as the line current command Isi0 in this example, the invention is not limited to this arrangement. For example, if importance is to be placed on decreasing a ripple current withstand rating of the filter capacitor 4 of the main converter 2, the line current command Isi0 should be the product of the calculated current command amplitude Is0 and a rectangular wave having a width 1. Although the filter capacitor voltage 82 of the main converter 2 once decreases when the load power 83 increases, the filter capacitor voltage 82 approaches the target voltage value 84 if the amplitude of a line current command value 81a (line current command Isi0) is increased in this case too as shown in FIG. 26.

Figure 27:
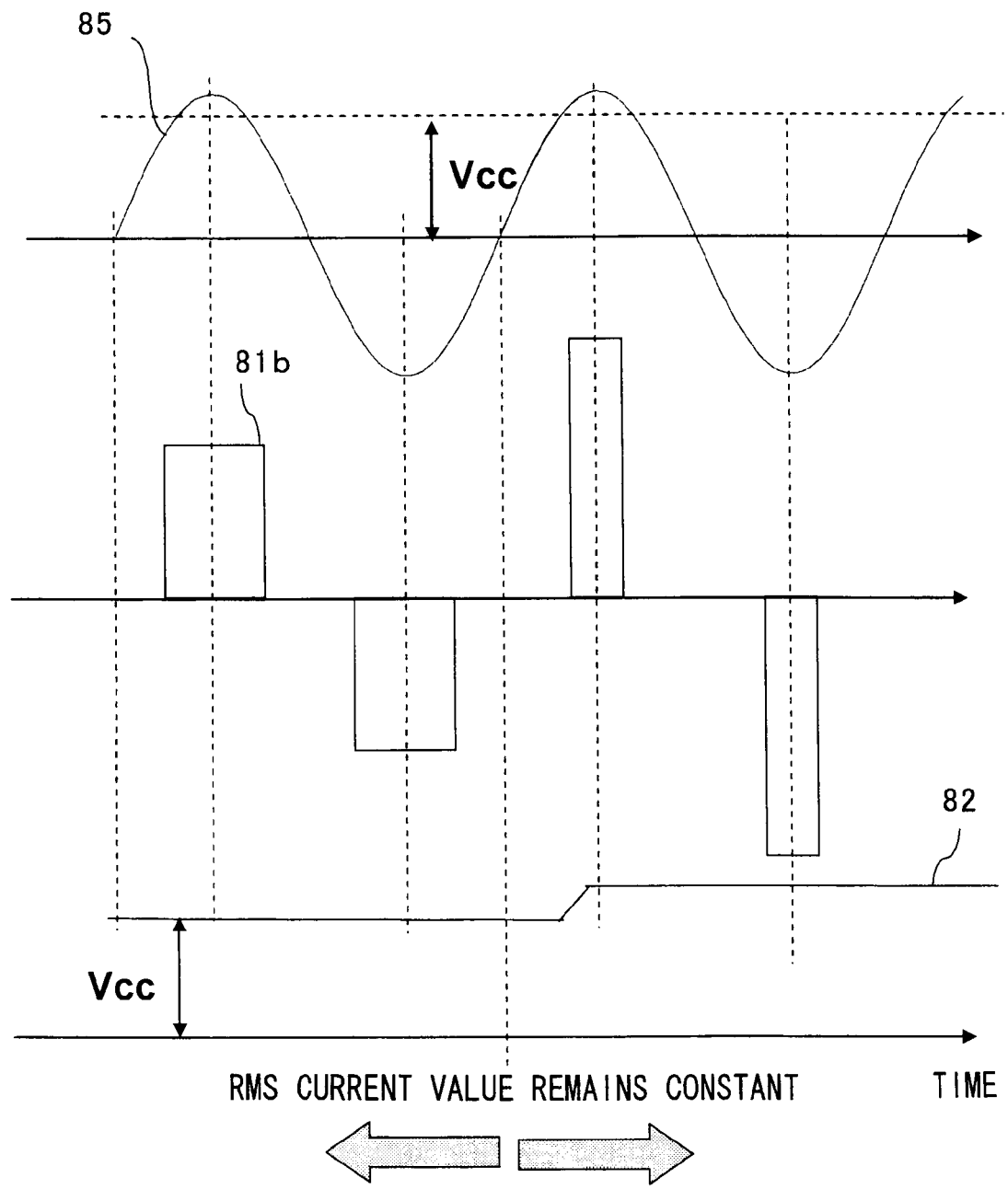
FIG. 27 is a representation of waveform charts for explaining another variation of the control operation of FIG. 24.

Also, when the power system's line-to-line voltage exceeds the filter capacitor voltage (DC voltage Vc) of the main converter 2, the filter capacitor 4 of the main converter 2 is charged to a fixed voltage. Therefore, it is possible to control the filter capacitor voltage of the main converter 2 by varying the waveform of the phase voltage Vsi in a way that increases a current peak value when the power system's line-to-line voltage almost reaches a peak value thereof. It is possible to increase the filter capacitor voltage 82 of the main converter 2 by increasing the current peak value of a line current command value 81b (line current command Isi0) when the power system's line-to-line voltage 85 almost reaches the peak value thereof even if an rms current value remains constant as shown in FIG. 27.

Figure 28:
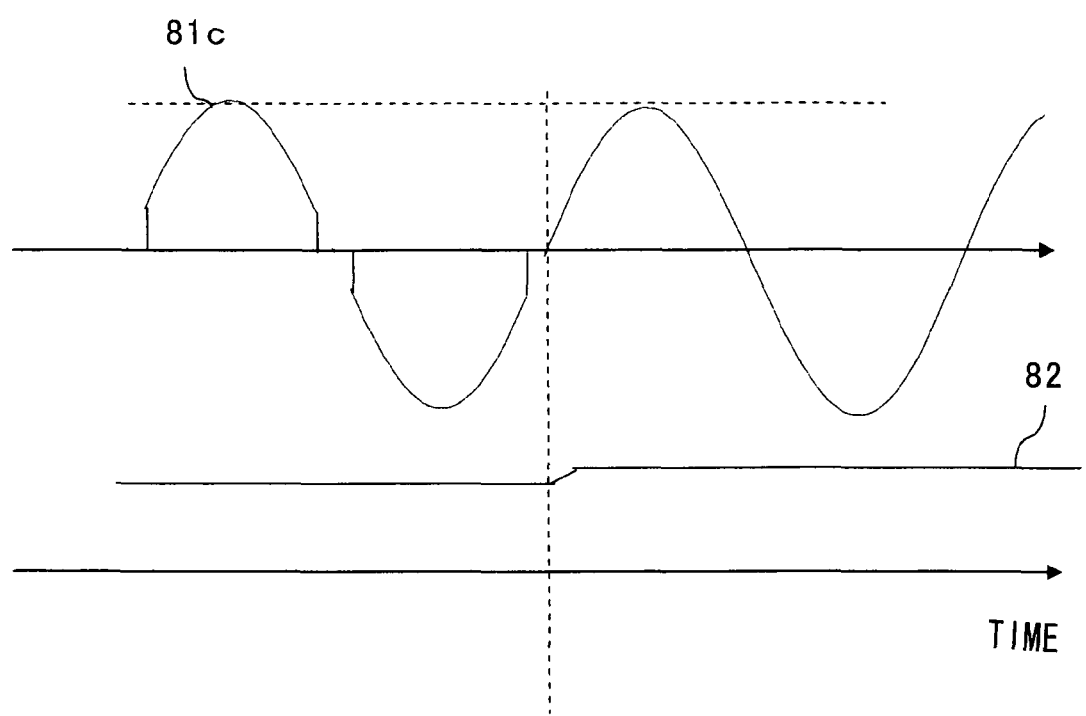
FIG. 28 is a representation of waveform charts for explaining another variation of the control operation of FIG. 24.

Furthermore, the filter capacitor voltage 82 of the main converter 2 may be controlled by varying a duration of flowing the line current Isi with a line current command value 81c (line current command Isi0) as shown in FIG. 28.

The above-described voltage command generation routine 24a calculates the amount of change of the power system's phase voltage Vsi (i=r, s, t) by PI control of the deviation of the line current Isi so that the measured line current Isi follows the current command Isi0 thus obtained and generates the voltage command Vir by adding the calculated amount of change to the phase voltage Vsi. Then, it is possible to control the filter capacitor voltage 82 (DC voltage Vc) of the main converter 2 as the power converter 7 outputs the voltage as specified by the voltage command and the line current Isi is varied.

Figure 29:
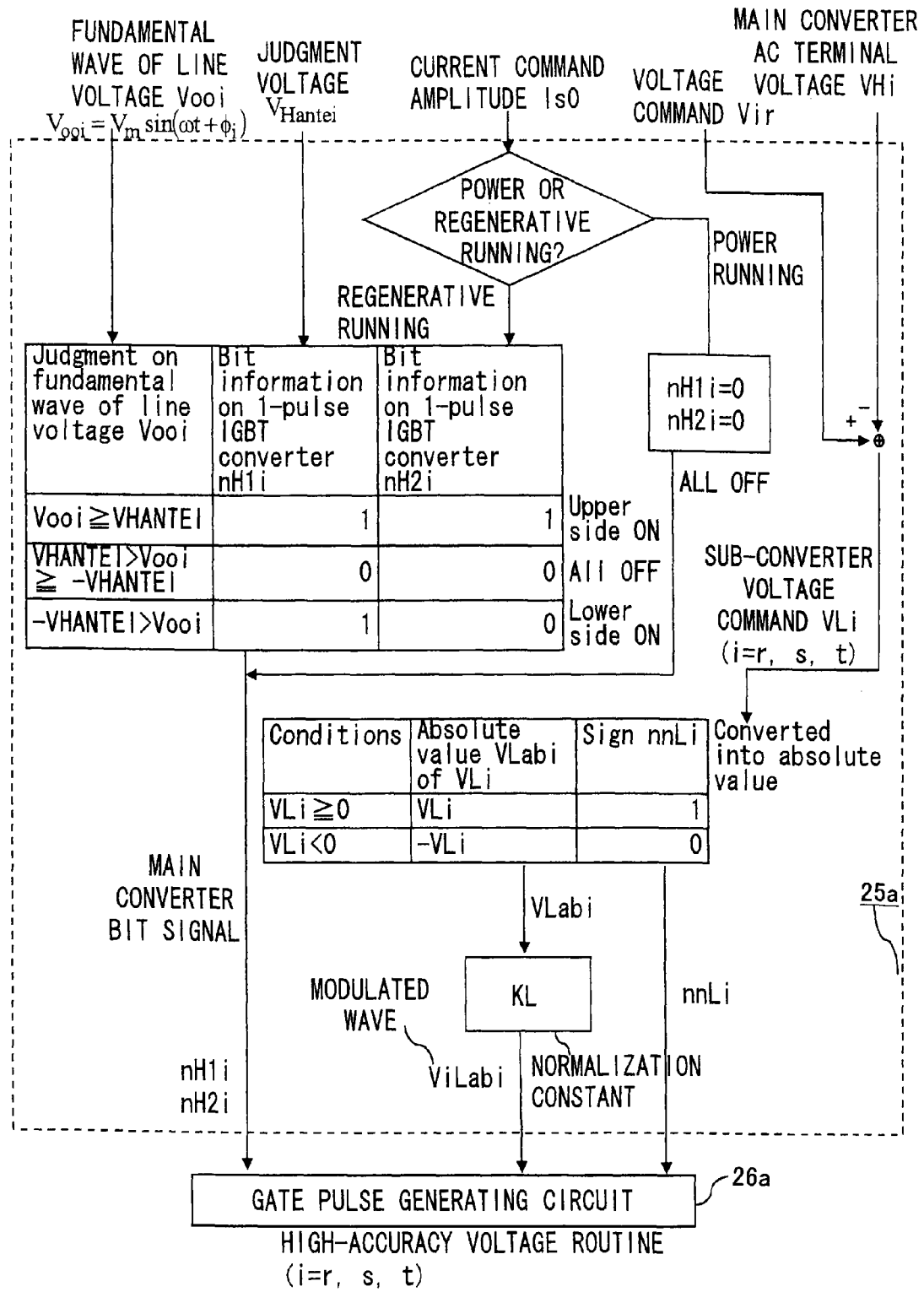
FIG. 29 is a flowchart showing part of the control operation performed by the power converting apparatus according to the third embodiment of the present invention.

FIG. 29 is a flowchart showing processing steps performed in the high-accuracy voltage routine 25a. The high-accuracy voltage routine 25a determines switching states of the main converter 2 and the individual sub-converters 3 and generates the control signals therefor.

First, in operation concerning the main converter 2, the high-accuracy voltage routine 25a judges whether the power converting apparatus is in the power running mode or the regenerative running mode from the current command amplitude Is0. In the power running mode, the main converter 2 works as a 3-phase, full-wave rectification circuit so that all of the switching states may be OFF and, in this case, two pieces of bit information nH1i, nH2i (i=r, s, t) used as the control signals for the main converter 2 are set to 0. In the regenerative running mode, the high-accuracy voltage routine 25a determines the two pieces of bit information nH1, nH2 as shown in a truth table at left in the Figure from the input fundamental wave of line voltage Vooi (i=r, s, t) and the judgment voltage VHantei.

In operation concerning the sub-converters 3, the high-accuracy voltage routine 25a determines a voltage command VLi (i=r, s, t) for each sub-converter 3 from a difference between the voltage command Vir for the power converter 7 and a phase voltage VHi (i=r, s, t) which is an AC terminal voltage of the main converter 2. Then, the high-accuracy voltage routine 25a determines an absolute value VLabi and sign nnLi (i=r, s, t) of the voltage command VLi for each sub-converter 3 as the control signal therefor as shown in a truth table at right in the Figure.

The control signals thus generated for the individual converters 2, 3 are input into the gate pulse generating circuit 26a.

The gate pulse generating circuit 26a generates the gate pulses for driving the switching devices in the individual converters 2, 3 based on the control signals corresponding to the voltage commands for the individual converters 2, 3 input from the high-accuracy voltage routine 25a. At this time, the gate pulse generating circuit 26a also generates dead time of the gate signals for preventing short-circuiting of the arms.

In a process of generating the gate pulses for the sub-converters 3, the gate pulse generating circuit 26a generates the gate pulses in such a way as to produce a voltage of the voltage command VLi for each sub-converter 3 that is the difference between the voltage command Vir for the power converter 7 and the phase voltage VHi of the main converter 2 with high accuracy by using a comparator circuit for performing PWM control operation.

Since the gate pulse generating circuit 26a is required to have a relatively high-speed processing capability, the gate pulse generating circuit 26a is usually configured with a logic circuit capable of performing parallel processing. Alternatively, however, the processing may be performed by software by use of a central processing unit (CPU) and a digital signal processor (DSP) having a high-speed processing capability, for example.

As thus far described, the power converter 7 is configured with the power converter 7 and the sub-converters 3 connected in series to generate phase voltages of the power converter 7 as the sums of phase voltages of the individual converters 2, 3 in this embodiment, so that it is not necessary to generate high-voltage pulses at a high switching frequency, and it is possible to suppress harmonics without increasing the size of a reactor in the power system and reduce power loss and electromagnetic noise. Accordingly, a power converting apparatus which offers high power conversion efficiency in a highly compact design is obtained.

In particular, since the power converting apparatus performs the current control operation by finely controlling the sub-converters 3 operating at relatively low voltage, the number of pulses contained in the output voltage of the main converter 2 operating at relatively high voltage becomes a few or less per half cycle and, further, switching loss and electromagnetic noise decrease. This effect is more advantageous if the main converter 2 produces a single pulse per half cycle.

Also, the present embodiment facilitates operation in the power and regenerative running modes as it is possible to perform the current control operation by the sub-converters 3. The pulselength of gate pulses for driving each switching device in the main converter 2 is so determined as to satisfy a condition that (capacitor voltage Vb of each sub-converter 3)=($\frac{1}{2}$·(line-to-line voltage)+(harmonic voltage Vnp)) even if harmonics are produced in the power system voltage in the regenerative running mode and a short circuit is formed when the arms of the same side of the main converter 2 turn on. This arrangement makes it possible to perform the current control operation and prevent a flow of overload currents, so that a higher-order protection switch is not turned off, thus permitting continued operation of the power converting apparatus. It is possible to reduce a current-limiting reactor in size at the same time.

Figure 30:
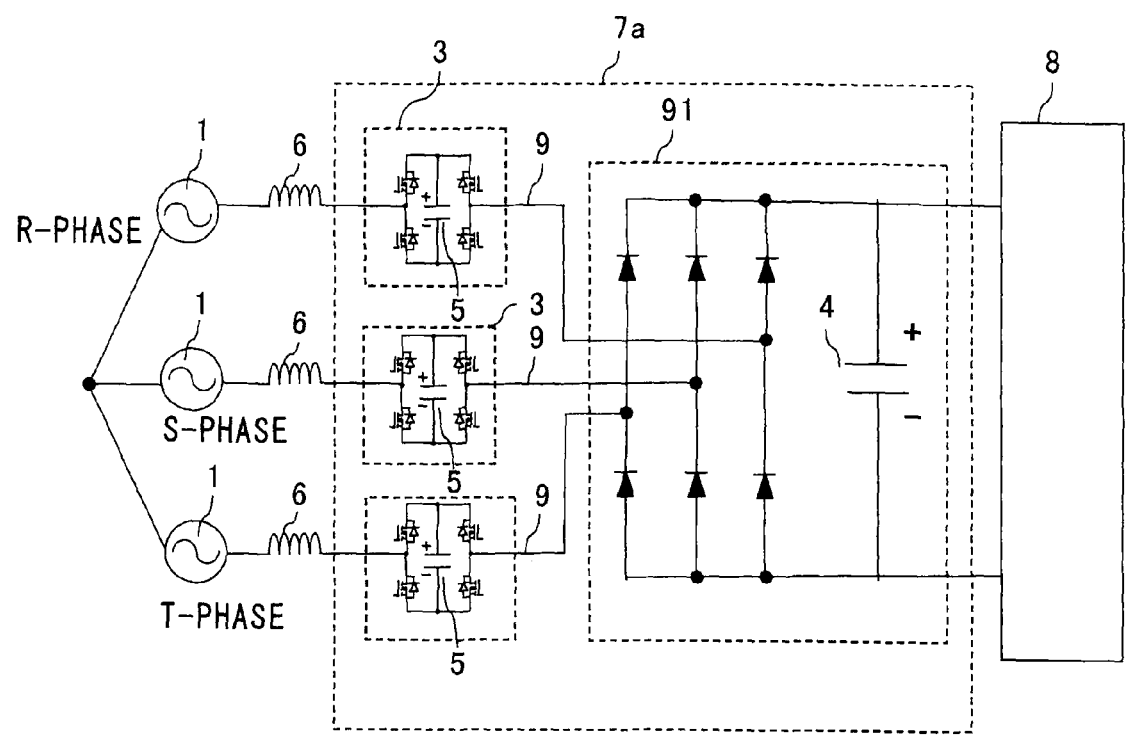
FIG. 30 is a configuration diagram of a power converting apparatus according to a variation of the third embodiment of the present invention.

The foregoing discussion of the individual embodiments has illustrated the power converting apparatus configured to operate in the power and regenerative running modes. If the apparatus need not be operated in the regenerative running mode, it is possible to configure a power converter 7a by using a main converter 91 having a full bridge arrangement of diodes instead of the main converter 2 as shown in FIG. 30. This makes it possible to achieve a cost reduction. Harmonics can be efficiently suppressed by PWM control operation of the sub-converters 3 in this case as well.

Fourth Embodiment

Figure 31:
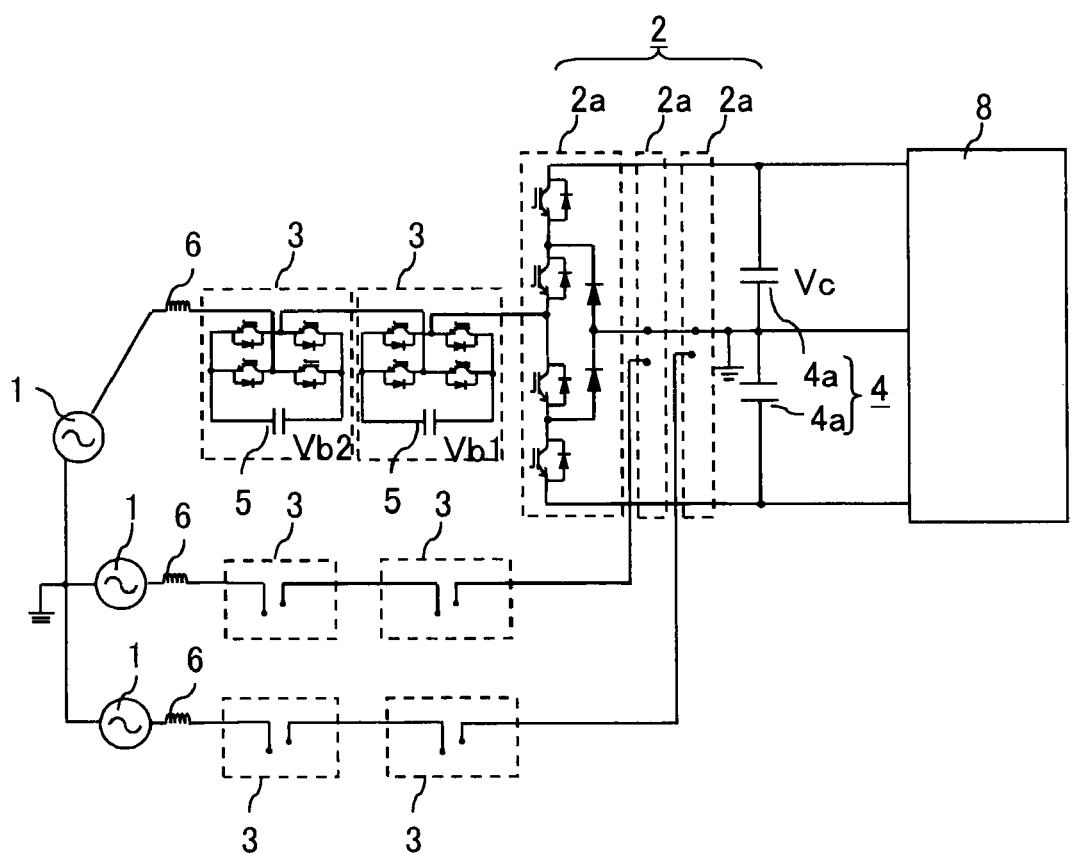
FIG. 31 is a configuration diagram of a power converting apparatus according to a fourth embodiment of the present invention.

While one sub-converter 3 is provided for each phase in the foregoing first to third embodiments, an AC side of a plurality of sub-converters 3 may be connected in series with each AC input line 9 of a main converter 2. FIG. 31 shows a power converting apparatus provided with a pair of sub-converters 3 for each phase. In this case, the main converter 2 is a 3-phase, 3-level converter of which individual phases 2a are configured as illustrated and a filter capacitor 4 includes a pair of series-connected filter capacitors 4a.

In the power converting apparatus thus configured, a DC voltage Vc of the filter capacitor 4 of the main converter 2 and DC voltages Vb1, Vb2 of filter capacitors 5 of the two sub-converters 3 of each phase have different values (Vc>Vb1>Vb2) having a relationship expressed by a ratio of 4:2:1, 4:3:1, 5:3:1, 6:3:1 or 7:3:1, for example. This relationship may be defined by other values according to product specifications or all of Vc, Vb1 and Vb2 may be the same voltage so that the number of component types is reduced. Shown in truth tables A-E in FIG. 32 are relationships between output logic values of the individual converters and output gradations (voltage levels) obtained by a power converter in which these converters are connected in series for each of the aforementioned ratios.

A case of Table A is explained hereinbelow.

Figure 33:
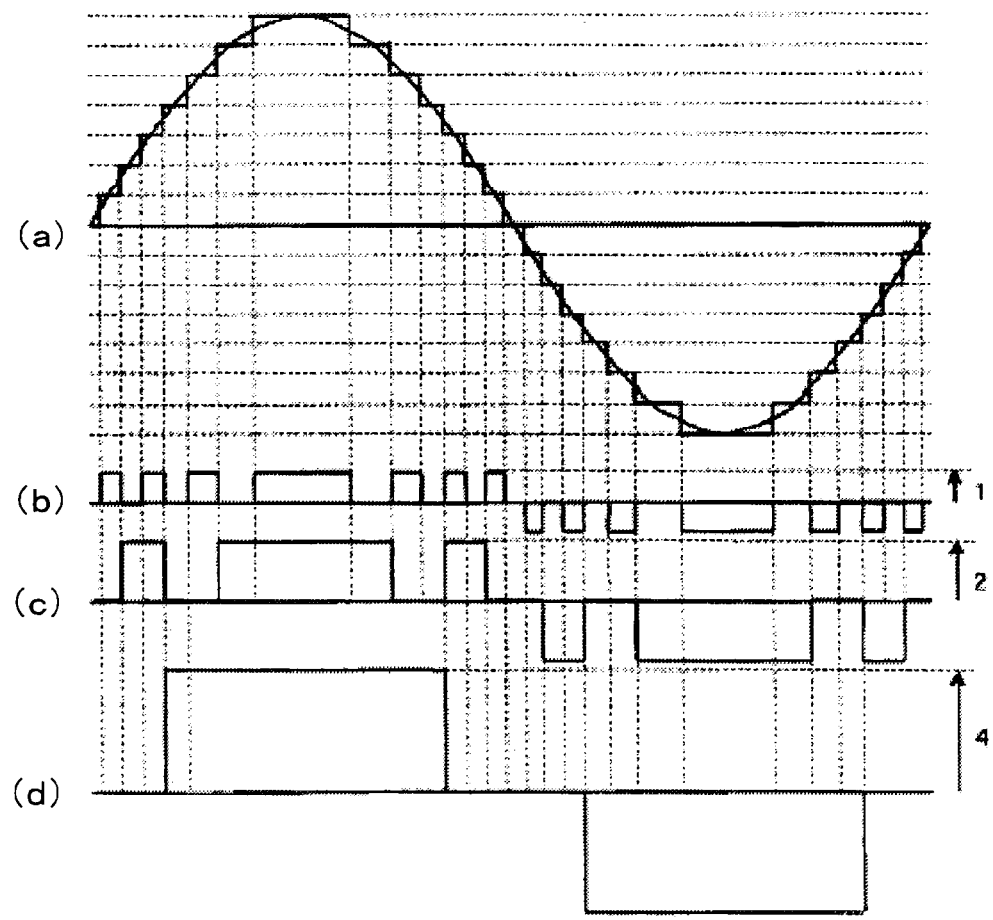
FIG. 33 is a representation of voltage waveforms of the individual converters of the power converting apparatus according to the fourth embodiment of the present invention.

Vc, Vb1 and Vb2 have a relationship expressed by the ratio of 4:2:1, and combinations of the three converters 2, 3 give 8-level gradations of phase voltages (absolute values) with the sums of these voltages produced at AC input terminals. Shown in FIG. 33 are voltage waveforms of the individual converters 2, 3 for obtaining sine wave gradations. FIG. 33(a) shows the voltage waveform of the entire power converter, FIG. 33(b) shows the voltage waveform of the sub-converter 3 having the DC voltage Vb2, FIG. 33(c) shows the voltage waveform of the sub-converter 3 having the DC voltage Vb1, and FIG. 33(d) shows the voltage waveform of the main converter 2 having the DC voltage Vc. It is understood that a smoothly graded voltage waveform is obtained by combinations of the voltages produced by the individual converters 2, 3.

In the aforementioned configuration of series connection of the main converter 2 and the plurality of sub-converters 3 having different DC voltages, the voltages produced at the AC input terminals create a smoothly graded multi-leveled voltage waveform, making it possible to suppress harmonics. Also, as the number of switching cycles of the main converter 2 operating at high voltage is reduced, it is possible to reduce switching loss, improve efficiency of the power converting apparatus and, further, decrease electromagnetic noise.

Furthermore, it is possible to apply the same control operation to this embodiment as used in the foregoing first to third embodiments so that the DC voltage Vb of the filter capacitor 5 of each sub-converter 3 can be held constant and, thus, the same advantageous effects as in the foregoing first to third embodiments are obtained in this case as well.

Additionally, it is possible to apply the same control operation to this embodiment as used in the foregoing third embodiment so that the current control operation can be performed by finely controlling the sub-converters 3 operating at relatively low voltage and, thus, the same advantageous effects as in the foregoing third embodiment are obtained.

In principle, the main converter 2 and the sub-converters 3 may output desired voltages by pulse-width modulation control, or PWM control. It is possible to improve accuracy of output voltages and suppress voltage and current harmonics with a small output filter.

In particular, if the number of output pulses of the main converter which handles high voltages is reduced and the sub-converters which handle low voltages are controlled by PWM, advantageous effects will be obtained with respect to both improvement of power conversion efficiency and suppression of harmonics.

INDUSTRIAL APPLICABILITY

The invention is widely applicable to power converting apparatuses for converting AC power into DC power with a capability to control power even in regenerative running mode.

The invention claimed is:

1. A power converting apparatus configured with a main converter and a sub-converter connected in series which individually convert electric power from AC into DC, wherein a DC voltage of said main converter is higher than a DC voltage of said sub-converter and said sub-converter is disposed between said main converter and an AC power supply, and wherein the DC voltage of said main converter is adjusted by controlling said power converting apparatus such that output power produced on an AC side of said sub-converter per recurring cycle thereof is held at zero level.

2. The power converting apparatus as recited in claim 1, wherein a DC voltage command value for said main converter is determined so that the DC voltage of said sub-converter follows a specific command value, a command value for a current flowing through said power converting apparatus is generated so that the DC voltage of said main converter follows the voltage command value, and said main converter and said sub-converter are controlled by an input voltage command for said power converting apparatus generated based on the command value for the flowing current.

3. The power converting apparatus as recited in claim 1, wherein, in adjusting the DC voltage of said main converter, increasing and decreasing directions of the DC voltage are switched depending on whether said power converting apparatus is operating in power running mode or regenerative running mode.

4. The power converting apparatus as recited in claim 1, wherein the DC voltage of said main converter adjusted by switching said power converting apparatus between power running mode or regenerative running mode.

5. A power converting apparatus configured with a main converter and a sub-converter connected in series which individually convert electric power from AC into DC, wherein a DC voltage of said main converter is higher than a DC voltage of said sub-converter and said sub-converter is disposed between said main converter and an AC power supply, and wherein an average phase voltage of said main converter is adjusted by controlling said main converter by PWM such that output power produced on an AC side of said sub-converter per recurring cycle thereof is held at zero level.

6. A power converting apparatus configured with a main converter and a sub-converter connected in series which individually convert electric power from AC into DC, wherein a DC voltage of said main converter is higher than a DC voltage of said sub-converter and said sub-converter is disposed between said main converter and an AC power supply, and wherein output power produced on an AC side of said sub-converter per recurring cycle thereof is held at zero level and the DC voltage of said main converter is controlled by adjusting an output period and amplitude of a current flowing in said power converting apparatus.

* * * * *